(12) United States Patent
Islam et al.

(10) Patent No.: US 10,880,927 B2
(45) Date of Patent: Dec. 29, 2020

(54) MAPPING RULES BETWEEN SYNCHRONIZATION SIGNAL BLOCKS AND RANDOM ACCESS CHANNEL RESOURCES

(71) Applicant: QUALCOMM Incorporated, San Diego, CA (US)

(72) Inventors: Muhammad Nazmul Islam, Edison, NJ (US); Navid Abedini, Somerset, NJ (US); Juergen Cezanne, Ocean Township, NJ (US); Bilal Sadiq, Basking Ridge, NJ (US); Sundar Subramanian, San Diego, CA (US); Sumeeth Nagaraja, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/160,441

(22) Filed: Oct. 15, 2018

(65) Prior Publication Data
US 2019/0159258 A1 May 23, 2019

Related U.S. Application Data

(60) Provisional application No. 62/621,436, filed on Jan. 24, 2018, provisional application No. 62/588,128, filed on Nov. 17, 2017.

(51) Int. Cl.
*H04W 74/08* (2009.01)
*H04W 56/00* (2009.01)
*H04L 5/00* (2006.01)

(52) U.S. Cl.
CPC ....... *H04W 74/0833* (2013.01); *H04L 5/0048* (2013.01); *H04L 5/0053* (2013.01);
(Continued)

(58) Field of Classification Search
CPC ............ H04W 74/0833; H04W 56/00; H04W 56/0005; H04W 56/001; H04L 5/0048;
(Continued)

(56) References Cited

U.S. PATENT DOCUMENTS 9,949,298 B1 * 4/2018 Akoum ............. H04W 74/0833
2016/0227580 A1 * 8/2016 Xiong ................... H04W 76/10
(Continued)

OTHER PUBLICATIONS

International Search Report and Written Opinion—PCT/US2018/056072—ISA/EPO—dated Jan. 8, 2019.
(Continued)

*Primary Examiner* — Kevin D Mew
(74) *Attorney, Agent, or Firm* — Arent Fox, LLP

(57) ABSTRACT

A node for wireless communication identifies a number of actually transmitted reference signals. The node identifies a number of available PRACH time-frequency resources and preamble indices in a time period. The node identifies a number of configured PRACH time-frequency resources or PRACH preamble indices per reference signal. The node determines that the available number of PRACH time-frequency resources or PRACH preamble indices within the time period is not an integer multiple of the product of the number of actually transmitted reference signals and the number of configured PRACH time-frequency resources or PRACH preamble indices per reference signal. The node maps the actually transmitted reference signals to the available PRACH time-frequency resources and preamble indices based on the identified information and determination.

78 Claims, 13 Drawing Sheets

(52) U.S. Cl.
CPC ....... *H04W 56/00* (2013.01); *H04W 56/0005* (2013.01); *H04L 5/0091* (2013.01)

(58) Field of Classification Search
CPC ... H04L 5/0053; H04L 5/0091; H04L 5/0094; H04L 5/0096
See application file for complete search history.

(56) References Cited

U.S. PATENT DOCUMENTS

| | | | | |
|---|---|---|---|---|
| 2016/0249384 | A1 | 8/2016 | Di Girolamo et al. | |
| 2017/0302355 | A1* | 10/2017 | Islam | H04W 74/0833 |
| 2017/0359114 | A1* | 12/2017 | Akkarakaran | H04W 72/0413 |
| 2017/0367069 | A1* | 12/2017 | Agiwal | H04W 68/02 |
| 2018/0092139 | A1* | 3/2018 | Novlan | H04W 56/001 |
| 2018/0167979 | A1* | 6/2018 | Guo | H04W 16/28 |
| 2018/0206272 | A1* | 7/2018 | Maaref | H04K 1/02 |
| 2018/0262313 | A1* | 9/2018 | Nam | H04L 5/005 |
| 2018/0279380 | A1* | 9/2018 | Jung | H04W 56/0005 |
| 2018/0324716 | A1* | 11/2018 | Jeon | H04W 52/50 |
| 2018/0324864 | A1* | 11/2018 | Jung | H04W 56/001 |
| 2018/0331794 | A1* | 11/2018 | Nagaraja | H04B 7/0695 |
| 2018/0332520 | A1* | 11/2018 | Cheng | H04W 36/0058 |
| 2018/0359717 | A1* | 12/2018 | Akkarakaran | H04L 27/2611 |
| 2018/0368189 | A1* | 12/2018 | Narasimha | H04W 74/0833 |
| 2019/0020461 | A1* | 1/2019 | Yerramalli | H04L 5/0057 |
| 2019/0053072 | A1* | 2/2019 | Kundargi | H04B 7/0695 |
| 2019/0053120 | A1* | 2/2019 | Park | H04W 76/27 |
| 2019/0058629 | A1* | 2/2019 | Akoum | H04B 7/0695 |
| 2019/0074891 | A1* | 3/2019 | Kwon | H04W 56/003 |
| 2019/0075014 | A1* | 3/2019 | Zhou | H04W 72/042 |
| 2019/0081721 | A1* | 3/2019 | Ly | H04J 11/0069 |
| 2019/0110314 | A1* | 4/2019 | Abedini | H04L 5/0048 |
| 2019/0132882 | A1* | 5/2019 | Li | H04W 74/0833 |
| 2019/0150190 | A1* | 5/2019 | Kim | H04W 74/08 370/329 |
| 2019/0274172 | A1* | 9/2019 | Yoon | H04W 74/0833 |

OTHER PUBLICATIONS

Qualcomm Incorporated: "4-step RACH Procedure Consideration", 3GPP Draft; R1-1713382 4-step RACH Procedure Consideration, 3rd Generation Partnership Project (3GPP), Mobile Competence Centre ; 650, Route Des Lucioles ; F-6921 Sophia-Antipolis Cedex ; France, vol. RAN WG1, No. Prague, Czech Republic; May 15, 2017-May 19, 2017 Aug. 20, 2017, XP051316187, Retrieved from the Internet: URL:http://www.3gpp.org/ftp/Meetings_3GPP_SYNC/RAN1/Docs/ [retrieved on Aug. 20, 2017], 13 pages.

Qualcomm Incorporated: "PRACH Procedure Considerations", 3GPP Draft, R1-1718532 PRACH Procedure Considerations, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017 (Oct. 8, 2017), XP051341714, 13 Pages, Retrieved from the Internet: URL:http://www.3gpp.org/ftp/Meetings_3GPP_SYNC/RAN1/Docs/ [retrieved on Oct. 8, 2017].

Qualcomm Incorporated: "Remaining Details on RACH Procedure", 3GPP Draft; R1-1802814, 3rd Generation Partnership Project (3GPP), Mobile Competence Centre ; 650, Route Des Lucioles ; F-06921 Sophia-Antipolis Cedex ; France, vol. RAN WG1, No. Athens, Greece; Feb. 26, 2018-Mar. 2, 2018 Feb. 17, 2018, XP051398226, Retrieved from the Internet: URL:http://www.3gpp.org/ftp/tsg%5Fran/WG1%5FRL1/TSGR1%5F92/Docs/ [retrieved on Feb. 17, 2018], 13 pages.

* cited by examiner

MAPPING RULES BETWEEN SYNCHRONIZATION SIGNAL BLOCKS AND RANDOM ACCESS CHANNEL RESOURCES

CROSS-REFERENCE TO RELATED APPLICATIONS

This application claims the benefit of U.S. Provisional Application Ser. No. 62/588,128 entitled "MAPPING RULES BETWEEN SYNCHRONIZATION SIGNAL BLOCKS AND RANDOM ACCESS CHANNEL RESOURCES" and filed on Nov. 17, 2017, and the benefit of U.S. Provisional Application Ser. No. 62/621,436 entitled "MAPPING RULES BETWEEN SYNCHRONIZATION SIGNAL BLOCKS AND RANDOM ACCESS CHANNEL RESOURCES" and filed on Jan. 24, 2018, each of which is expressly incorporated by reference herein in its entirety.

BACKGROUND

Aspects of the present disclosure relate generally to wireless communication networks, and more particularly, to communications between a user equipment (UE) and one or more base stations.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, current random access solutions may not provide a desired level of speed or customization for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communications at a first node. The method may include identifying a number of actually transmitted reference signals. The method may include identifying a number of available physical random access channel (PRACH) time-frequency resources in a time period. The method may include identifying, a number of configured PRACH time-frequency resources per reference signal. The method may include determining that the available number of PRACH time-frequency resources within the time period is not an integer multiple of the product of the number of actually transmitted reference signals and the number of configured PRACH time-frequency resources per reference signal. The method may include mapping the actually transmitted reference signals to the available PRACH time-frequency resources based on the identified information and determination.

In another aspect, the present disclosure provides an apparatus for wireless communications at a first node. The apparatus may include a transceiver, a memory, and a processor communicatively coupled with the transceiver and the memory. The processor may be configured to identify a number of actually transmitted reference signals. The processor may be configured to identify a number of available PRACH time-frequency resources in a time period. The processor may be configured to identify, a number of configured PRACH time-frequency resources per reference signal. The processor may be configured to determine that the available number of PRACH time-frequency resources within the time period is not an integer multiple of the product of the number of actually transmitted reference signals and the number of configured PRACH time-frequency resources per reference signal. The processor may be configured to map the actually transmitted reference signals to the available PRACH time-frequency resources based on the identified information and determination.

In another aspect, the disclosure provides an apparatus for wireless communications at a first node. The apparatus may include means for identifying a number of actually transmitted reference signals. The apparatus may include means for identifying a number of actually transmitted reference signals. The apparatus may include means for identifying a number of available PRACH time-frequency resources in a time period. The apparatus may include means for identifying a number of configured PRACH time-frequency resources per reference signal. The apparatus may include means for determining that the available number of PRACH time-frequency resources within the time period is not an integer multiple of the product of the number of actually transmitted reference signals and the number of configured PRACH time-frequency resources or PRACH preamble indices per reference signal. The apparatus may include means for mapping the actually transmitted reference signals to the available PRACH time-frequency resources and preamble indices based on the identified information and determination.

In an aspect, the disclosure provides a computer-readable medium storing computer code executable by a processor of a first node for wireless communications. The computer-readable medium may include code to identify a number of actually transmitted reference signals. The computer-readable medium may include code to identify a number of available PRACH time-frequency resources in a time period. The computer-readable medium may include code to identify a number of configured PRACH time-frequency resources per reference signal. The computer-readable medium may include code to determine that the number of available PRACH time-frequency resources within the time period is not an integer multiple of the product of the number of actually transmitted reference signals and the number of configured PRACH preamble indices per reference signal. The computer-readable medium may include code to map the actually transmitted reference signals to the available PRACH time-frequency resources based on the identified information and determination.

In an aspect, the disclosure provides a method of wireless communications. The method may include receiving, at a UE, an indication of a number of actually transmitted SS-blocks transmitted by a base station. The method may include receiving, at the UE, a PRACH configuration index identifying a RACH configuration period and a number of configured PRACH resources per SS-block. The method may include determining a time period that contains a number of PRACH resources greater than the product of the number of actually transmitted SS-blocks and the number of PRACH resources per SS-block. The method may include determining that a supported number of PRACH resources within the RACH time period is not an integer multiple of the product of the number of actually transmitted SS-blocks and the number of configured PRACH resources per SS-block. The method may include mapping the number of actually transmitted SS-blocks an integer number of times within the PRACH resources of the time period, wherein a remaining number of PRACH resources are not assigned to an SS-block.

In another aspect, the disclosure provides a UE. The UE may include a transceiver, a memory, and a processor communicatively coupled with the transceiver and the memory. The processor may be configured to receive, at the UE, an indication of a number of actually transmitted SS-blocks transmitted by a base station. The processor may be configured to receive, at the UE, a PRACH configuration index identifying a RACH configuration period and a number of configured PRACH resources per SS-block. The processor may be configured to determine a time period that contains a number of PRACH resources greater than the product of the number of actually transmitted SS-blocks and the number of PRACH resources per SS-block. The processor may be configured to determine that a supported number of PRACH resources within the time period is not an integer multiple of the product of the number of actually transmitted SS-blocks and the number of configured PRACH resources per SS-block. The processor may be configured to map the number of actually transmitted SS-blocks an integer number of times within the PRACH resources of the time period, wherein a remaining number of PRACH resources are not assigned to an SS-block.

In another aspect, the disclosure provides a UE. The UE may include means for receiving, at the UE, an indication of a number of actually transmitted SS-blocks transmitted by a base station. The UE may include means for receiving, at the UE, a PRACH configuration index identifying a RACH configuration period and a number of configured PRACH resources per SS-block. The UE may include means for determining a time period that contains a number of PRACH resources greater than the product of the number of actually transmitted SS-blocks and the number of PRACH resources per SS-block. The UE may include means for determining that a supported number of PRACH resources within the time period is not an integer multiple of the product of the number of actually transmitted SS-blocks and the number of configured PRACH resources per SS-block. The UE may include means for mapping the number of actually transmitted SS-blocks an integer number of times within the PRACH resources of the time period, wherein a remaining number of PRACH resources are not assigned to an SS-block.

In another aspect, the present disclosure provides a computer-readable medium storing computer code executable by a processor for wireless communications. The computer readable medium may include code to receive, at a UE, an indication of a number of actually transmitted SS-blocks transmitted by a base station. The computer readable medium may include code to receive, at the UE, a PRACH configuration index identifying a RACH configuration period and a number of configured PRACH resources per SS-block. The computer readable medium may include code to determine a time period that contains a number of PRACH resources greater than the product of the number of actually transmitted SS-blocks and the number of PRACH resources per SS-block. The computer readable medium may include code to determine that a supported number of PRACH resources within the time period is not an integer multiple of the product of the number of actually transmitted SS-blocks and the number of configured PRACH resources per SS-block. The computer readable medium may include code to map the number of actually transmitted SS-blocks an integer number of times within the PRACH resources of the time period, wherein a remaining number of PRACH resources are not assigned to an SS-block.

In an aspect, the present disclosure includes a method of wireless communications. The method may include transmitting, from a base station, a number of SS-blocks and an indication of a number of transmitted SS-blocks. The method may include transmitting, from the base station, a PRACH configuration index defining a RACH configuration period. The method may include designating a mapping between the number of transmitted SS-blocks to PRACH resources or PRACH preamble indices within the RACH configuration period, wherein the mapping assigns different SS-blocks to PRACH resources or PRACH preamble indices for different groups of user equipment.

In another aspect, the disclosure provides a base station for wireless communications including a transceiver, a memory, and a processor communicatively coupled with the transceiver and the memory. The processor may be configured to transmit, from a base station, a number of SS-blocks and an indication of a number of transmitted SS-blocks. The processor and the memory may be configured to transmit, from the base station, a PRACH configuration index defining a RACH configuration period. The processor and the memory may be configured to map the number of transmitted SS-blocks to PRACH resources or PRACH preamble indices within the RACH configuration period, wherein the mapping assigns different SS-blocks to PRACH resources or PRACH preamble indices for different groups of user equipment.

In another aspect, the disclosure provides a base station for wireless communications including means for transmitting, from a base station, a number of SS-blocks and an indication of a number of transmitted SS-blocks. The base station may include means for transmitting, from the base station, a PRACH configuration index defining a RACH configuration period. The base station may include means for designating a mapping between the number of transmitted SS-blocks to PRACH resources or PRACH preambles within the RACH configuration period, wherein the mapping assigns different SS-blocks to PRACH resources or PRACH preamble indices for different groups of user equipment.

In an aspect, the disclosure provides a computer-readable medium storing computer code executable by a processor for wireless communications. The computer-readable medium may include code for transmitting, from a base station, a number of SS-blocks and an indication of a number of transmitted SS-blocks. The computer-readable medium may include code for transmitting, from the base station, a PRACH configuration index defining a RACH configuration period. The computer-readable medium may include code for designating a mapping between the number of transmitted SS-blocks to PRACH resources or PRACH preamble indices within the RACH configuration period, wherein the mapping assigns different SS-blocks to PRACH resources or PRACH preamble indices for different groups of user equipment.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
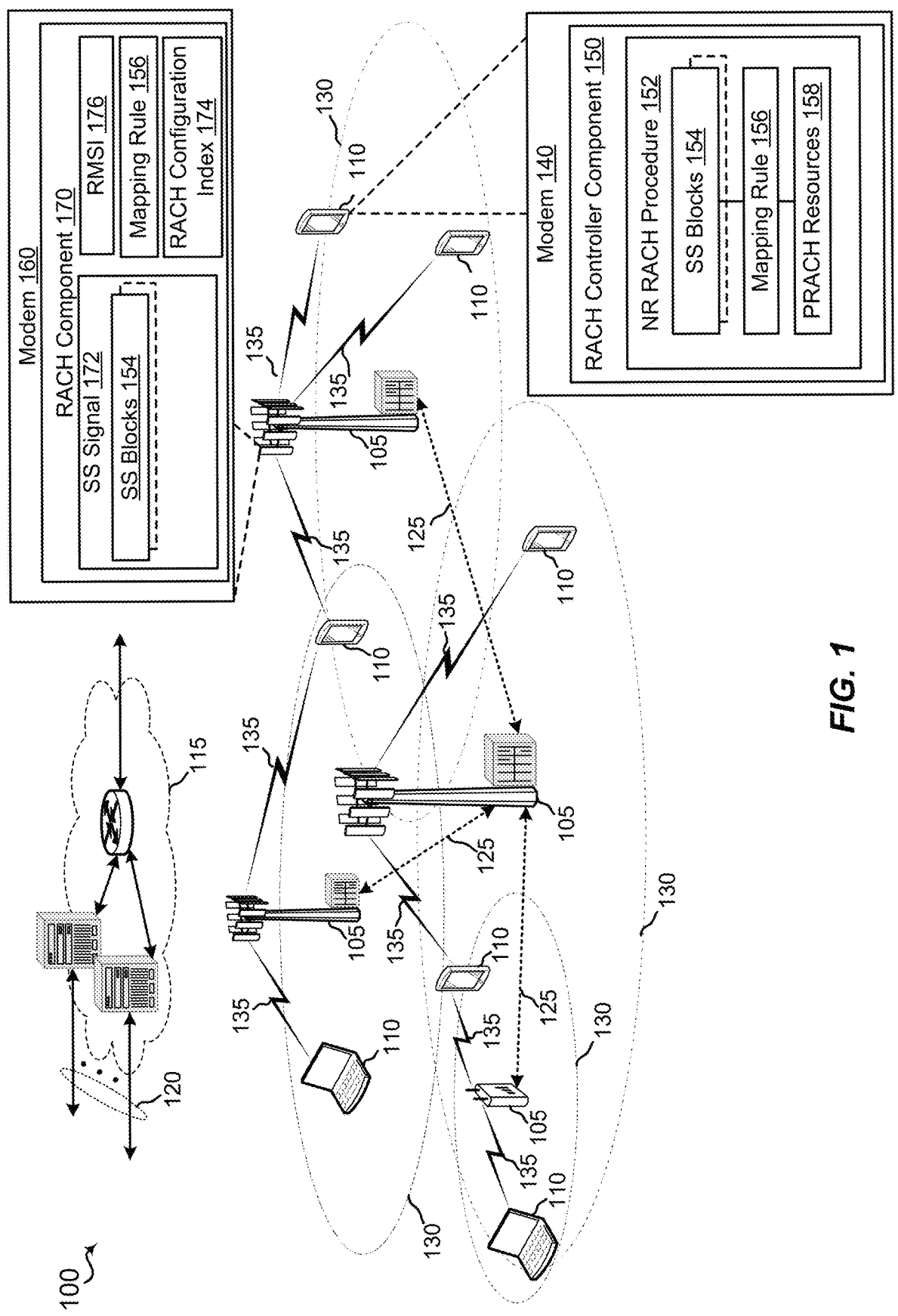
FIG. 1 is a schematic diagram of an example wireless communication network including at least one UE having a RACH controller component configured according to this disclosure to transmit a RACH message using an uplink resource selected based on a synchronization signal block.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to mapping of synchronization signal blocks (SS-blocks) to random access channel (RACH) resources for a new radio (NR) RACH procedure that may be executed by a UE and/or a base station, resulting in procedures that may be more efficient than existing RACH procedures and timelines. For example, the NR RACH procedure may adapt based on a number of actually transmitted SS-blocks to efficiently utilize RACH resources. Additionally, the NR RACH procedure may repurpose RACH resources remaining after mapping transmitted SS-blocks to configured RACH resources. The remaining RACH resources may otherwise be idle due to reduced SS-block transmissions. Accordingly, a base station may provide a special mapping that allocates the otherwise idle remaining RACH resources for another purpose. For example, the RACH resources may provide a UE with additional opportunities to transmit RACH messages based on other actually transmitted SS-blocks, thereby reducing latency. As another example, one or more UEs may be scheduled for uplink transmissions using the RACH resources. In a time division duplexing (TDD) system, the base station may utilize the RACH resources for a downlink transmission.

Additional features of the present aspects are described in more detail below with respect to FIGS. 1-13.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes a new radio (NR)/5G system for purposes of example, and NR/5G terminology is used in much of the description below, although the techniques are applicable beyond NR/5G applications (e.g., to other 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 with a modem 140 having a RACH controller component 150. The RACH controller component 150 manages execution of a NR RACH procedure 152, in communication with a base station 105, resulting in selection of PRACH resources 158 corresponding to an SS-block 154 for use in the RACH procedure 152. For example, the NR RACH procedure 152 may be configured to select a SS-block from among received SS-blocks 154 for transmission of a RACH message. In an aspect, the RACH controller component 150 may map the selected SS-block 154 to the PRACH resources 158 based on a RACH resource mapping rule 156. For example, the RACH controller component 150 may select the RACH resource mapping rule 156 based on a specified mapping or a mapping signaled by the base station 105. Further, wireless communication network 100 includes at least one base station 105 with a modem 160 having a RACH component 170 that may manage execution of a NR RACH procedure 152 via communication with the UE 110. The RACH component 170, independently or in combination with the RACH controller component 150 of the UE 110, may transmit a number of the SS-blocks 154 and determine the mapping rule 156 for receiving RACH messages on corresponding PRACH resources 158. The RACH component 170 may, for example, transmit a PRACH configuration index 174 and a remaining minimum system information (RMSI) 176, which may be used by the RACH controller component 150 of the UE 110 to perform the same mapping of SS-blocks 154 to PRACH resources 158. Thus, according to the present disclosure, the NR RACH procedure 152 may be executed in a manner that improves an efficiency of a UE 110 in randomly accessing a base station 105 and establishing a communication connection.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. For example, the core network 115 may be a 4G Evolved Packet Core (EPC) or a 5G Core (5GC). The base stations 105 may interface with the core network 115 through backhaul links 120 (e.g., 51, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNodeB (gNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the radio resource control (RRC) protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

The UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communication network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
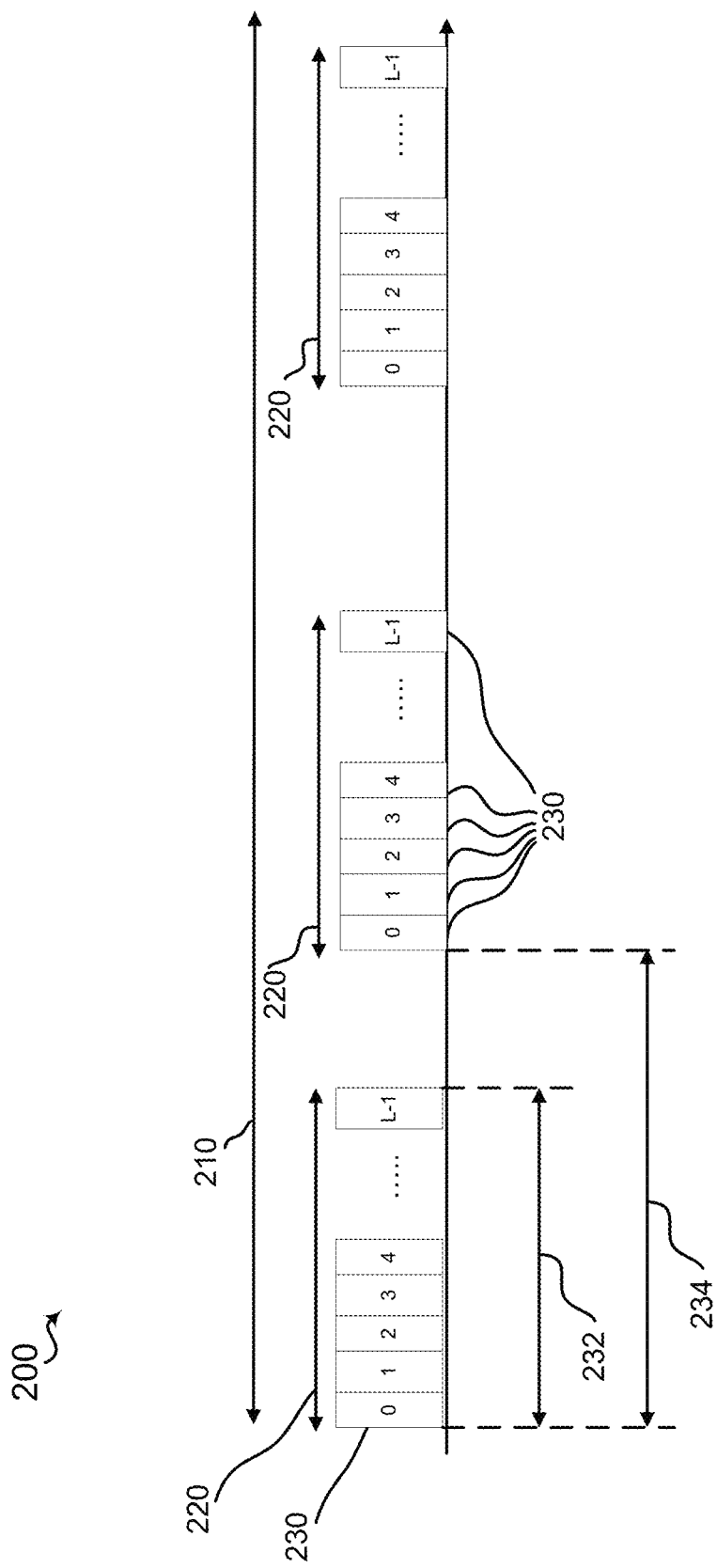
FIG. 2 is a conceptual diagram of an example synchronization signal including multiple synchronization signal blocks.

Referring to FIG. 2, a base station 105 may transmit a synchronization signal 210 (or synchronization signal burst series) for UEs to perform cell detection and measurement. For certain frequency bands (e.g., >6 GHz or mmWave), the synchronization signal 210 may be transmitted in the form of a sweeping beam. The sweeping beam may include periodic synchronization signal bursts 220 of SS-blocks 230. For example, the SS-burst 220 may include L SS-blocks 230. In an example, the number of SS-blocks L may be 64, for example, in spectrum >6 GHz. Fewer SS-blocks may be supported in lower frequency spectrum. The SS-burst 220 may have a duration 232 and a periodicity 234. The SS-blocks 230 may, for example, include an NR primary synchronization signal (NR-PSS), an NR secondary synchronization signal (NR-SSS), and an NR Physical broadcast channel (NR-PBCH). The SS-burst 220 comprises multiple SS-blocks 230 to enable repetitive transmissions of SS-blocks in different directions for multi-beam configurations. A SS-burst set includes multiple SS-bursts to complete the beam sweeping of a coverage area 130. For a multi-beam configuration, a base station 105 may transmit SS-blocks 230 from the same beam multiple times within one SS-burst. The number of SS-bursts 220 within a SS-burst set and the number of SS-blocks 230 within a SS-burst 220 may be determined based on the deployment scenario and operating frequency band. For example, the number (L) of SS-blocks 230 within a SS-burst 220 in the deployment scenario of beam sweeping in multi-beam configuration may be determined by the number of beams and the downlink/guard period/uplink (DL/GP/UL) configuration. In order to complete beam-sweeping the coverage area 130, each beam may have at least one SS-block transmission over the sweeping interval. The number of SS-bursts 220 within a SS-burst set and SS-blocks 230 within a SS-burst 220 may be flexibly determined in the deployment.

Figure 3:
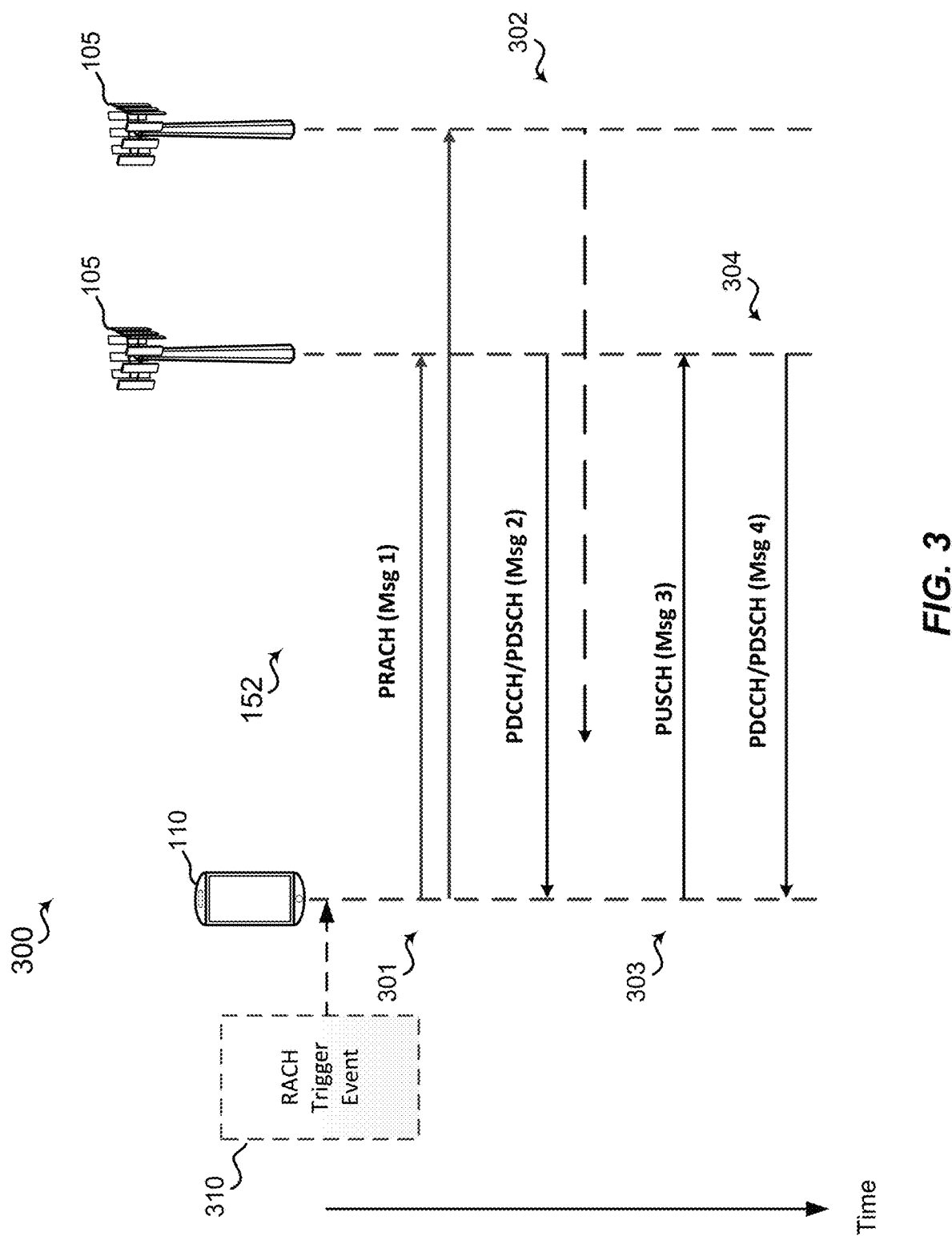
FIG. 3 is a message diagram of an example RACH procedure.

Referring additionally to FIG. 3 and Table 1 (below), during operation, the UE 110 may execute an implementation of the NR RACH procedure 152 of the present disclosure, according to a 4-step NR RACH message flow 300, due to the occurrence of one or more RACH trigger events 310. Suitable examples of a RACH trigger event 310 may include, but are not limited to one or more of: (i) an initial access from RRC_IDLE to RRC_CONNECTED ACTIVE; (ii) downlink (DL) data arrival during RRC_IDLE or RRC_CONNECTED INACTIVE; (iii) UL data arrival during RRC_IDLE or RRC_CONNECTED INACTIVE; (iv) a handover during the connected mode of operation; and (v) a connection re-establishment (e.g., a beam failure recovery procedure).

The NR RACH procedure 152 may be associated with a contention based random access, or with a contention free random access. In an implementation, a contention based NR RACH procedure 152 corresponds to one or more of the following RACH trigger events 310: an initial access from RRC_IDLE to RRC_CONNECTED ACTIVE; UL data arrival during RRC_IDLE or RRC_CONNECTED INACTIVE; and, a connection re-establishment. In an implementation, a contention-free NR RACH procedure 152 corresponds to one or more of the following RACH trigger events 310: downlink (DL) data arrival during RRC_IDLE or RRC_CONNECTED INACTIVE; and, a handover during the connected mode of operation.

On the occurrence of any of the above RACH trigger events 310, the execution of NR RACH procedure 152 may include 4-step NR RACH message flow 300 (see FIG. 3 and Table 1), where the UE 110 exchanges messages with one or more base stations 105 to gain access to a wireless network and establish a communication connection.

TABLE 1

NR RACH procedure 152, including Messages and Message Content transmitted over corresponding Physical (PHY) channel(s).

| PHY Channel | Message | Message content |
| --- | --- | --- |
| PRACH | Msg 1 | RACH Preamble |
| PDCCH/PDSCH | Msg 2 | Detected RACH preamble ID, TA, TC-RNTI, backoff indicator, UL/DL grants |
| PUSCH | Msg 3 | RRC Connection request (or scheduling request and tracking area update) |
| PDCCH/PDSCH | Msg 4 | Contention resolution message |

At 301, for example, the UE 110 may transmit a first message (Msg 1), which may be referred to as a random access request message, to one or more base stations 105 via a physical channel, such as a physical random access channel (PRACH). For example, Msg 1 may include one or more of a RACH preamble and a resource requirement.

At 302, one of more of the base stations 105 may respond to Msg 1 by transmitting a second message (Msg 2), which may be referred to as a random access response (RAR) message, over a physical downlink control channel (e.g., PDCCH) and/or a physical downlink shared channel (e.g., PDSCH). For example, Msg 2 may include one or more of a detected preamble identifier (ID), a timing advance (TA) value, a temporary cell radio network temporary identifier (TC-RNTI), a backoff indicator, an UL grant, and a DL grant.

At 303, in response to receiving Msg 2, the UE 110 transmits a third message (Msg 3), which may be an RRC connection request or a scheduling request, via a physical uplink channel (e.g., PUSCH) based on the UL grant provided in Msg 2. In an aspect, Msg 3 may include a tracking area update (TAU), such as on a periodic basis or if the UE 110 moves outside of one or more tracking areas (TAs) initially provided to the UE 110 in a tracking area identifier (TAI) list. Also, in some cases, Msg 3 may include a connection establishment cause indicator, which identifies a reason why the UE 110 is requesting to connect to the network.

At 304, in response to receiving Msg 3, the base station 105 may transmit a fourth message (Msg 4), which may be referred to as a contention resolution message, to the UE 110 via a physical downlink control channel (e.g., PDCCH) and/or a physical downlink shared channel (e.g., PDSCH). For example, Msg 4 may include a cell radio network temporary identifier (C-RNTI) for the UE 110 to use in subsequent communications.

In the above description, a collision scenario was not discussed but a collision between two or more UEs 110 requesting access can occur. For instance, two or more UEs 110 may send Msg 1 having a same RACH preamble, since the number of RACH preambles may be limited and may be randomly selected by each UE in a contention-based NR RACH procedure 152. As such, each UE will receive the same temporary C-RNTI and the same UL grant, and thus each UE may send a similar Msg 3. In this case, the base station 105 may resolve the collision in one or more ways: (i) both Msg 3 may interfere with each other, and so the base station 105 may not send Msg 4, thus each UE will retransmit Msg 1; (ii) the base station 105 may successfully decode only one Msg 3 and send an ACK message to that UE; and (iii) the base station 105 may successfully decode both Msg 3s, and then send a Msg 4 having a contention resolution identifier (e.g., an identifier tied to one of the UEs) to both UEs, and each UE receives the Msg 4, decodes the Msg4, and determines if they are the correct UE by successfully matching or identifying the contention resolution identifier. Such a collision problem may not occur in a contention-free NR RACH procedure 152, as in that case, the base station 105 may inform the UE 110 of which RACH preamble to use.

The RACH controller component 150 of the UE 110 may select physical random access channel (PRACH) resources for the Msg1 transmission based on the best received SS-block 154. The selection of the best SS-block 154 during Msg1 transmission allows the base station 105 to find the set of appropriate directions to transmit CSI-RS for the UE 110. However, the network 100 may also obtain the strongest SS-block index of the UE by configuring it to convey this information explicitly through Msg3 of contention based random access and implicitly through Msg1 of contention free random access in dedicated time/frequency regions. Additionally, the network 100 may configure the UE 110 to report the strongest SS-block in Msg3 of contention based random access and Msg1 of contention free random access that occurs in dedicated time/frequency region. The network 100 may use this information to find appropriate CSI-RS directions for the UE 110.

The PRACH resources available to a UE 110 (e.g., for transmitting Msg1) may be defined by a PRACH configuration index 174. The PRACH configuration index 174 may be signaled by the base station 105. The PRACH configuration index 174 may identify a pattern of RACH resources to be repeated every RACH configuration period. Specific RACH resource patterns may be standardized and signaled by the PRACH configuration index 174 signaled by the base station (e.g., in the RMSI 176 or in a handover message). For example, a pattern may define a density and duration of the PRACH resources. For instance, a pattern may define PRACH resources in every slot. The PRACH configuration index 174 may also indicate the RACH configuration period. Example RACH configuration periods may be 10, 20, or 40 milliseconds (ms), but longer RACH configuration periods of 80 ms or 160 ms may be used. The RACH configuration period may depend on a portion of spectrum (e.g., above or below 6 GHz) being used. The pattern and configuration period may be specified as a table, formula, etc.

As described above, the present disclosure provides an example method of wireless communications at a first node that may include identifying a number of actually transmitted reference signals, identifying a number of available PRACH time-frequency resources and preamble indices in a time period, identifying, a number of configured PRACH preamble indices or PRACH time-frequency resources per reference signal, determining that a supported number of PRACH preamble indices within the time period is not an integer multiple of the product of the number of actually transmitted reference signals and the number of configured PRACH preamble indices or PRACH time-frequency resources per reference signal, and mapping the actually transmitted reference signals to the available PRACH time-frequency resources and preamble indices based on the identified information and determination. That is, a mapping of synchronization signals to RACH resources or RACH preamble repeats after a time period, and there may be various rules to handle such mapping.

The time period may be based on the RACH configuration period, which may be a duration of time after which the RACH resources in time domain get repeated. For example, RACH configuration period may be 10 ms, where within every 10 ms the RACH resources are either falling on the 4th or 6th ms of the period.

The time period may be written or defined as $2^x \times a$ pre-specified time period (e.g., $2^x$ multiplied by a pre-specified time period), where the pre-specified time period may be 5 ms, 10 ms, 20 ms, 160 ms, or other time periods, and where the pre-specified time period may be specified by a standard or regulation. The pre-specified time period itself may be written or defined as $10 \times 2^y$ in order to relate the pre-specified time period to a radio frame.

The time period may be written or defined as $2^x \times a$ network configured time period (e.g., $2^x$ multiplied by a network configured time), where the network configured time period can be RACH configuration period as described above, a synchronization signal (SS) burst set period (a period after which the SS transmitted by the base station get repeated, which may be 5, 10, 20 for standalone scenarios in NR or 5 ms, 10 ms, 20 ms, 40 ms, 80 ms, or 160 ms for non-standalone scenarios in NR), a remaining minimum system information (RMSI) period, or some other time period, or any function of one or more of these time periods (e.g., minimum or maximum of the RACH configuration period and the SS burst set period). A network may configure this time period through one or more combinations of master information block (MIB) (which may be conveyed through PDCH), RMSI (which may be conveyed through PDSCH and/or PDCCH), broadcast other system information (OSI), handover message, RRC message, MAC-CE, downlink control information (DCI), or the like. In some aspects, the RMSI may be the main mechanism to configure the time period.

The parameter x described above to specify the time period may be a non-negative integer. The parameter x can be, for example, the minimum (non-negative) integer that allows mapping from all actually transmitted synchronization signal blocks to RACH resources/preambles in one time period.

The following is an example for a network configured time period. In this example, the following parameters may be considered: a number of actually transmitted SS-blocks=36 and may be indicated by RMSI (here, e.g., the base station may transmit SS up to 64 directions), a RACH configuration period=160 ms, a number of RACH occasions (that is, the time-frequency resources; each RACH occasion may have 64 preambles) in each RACH configuration period=8, and a number of SS-blocks (SSBs) per RACH occasion=2 (e.g., if an SSB1 is selected, preambles 1-32 are selected, and if an SSB2 is selected, preambles 33-64 are selected). In each RACH configuration period, it is possible to accommodate 16 (i.e., =8*2) actually transmitted SS-blocks. Accordingly, $2^1$ (2=2 to the power of 1) number of RACH configuration periods cannot hold all 36 actually transmitted SS-blocks and, therefore, a $2^2$ (4=2 to the power of 2) number of RACH configuration periods are needed to hold all 36 actually transmitted SS-blocks. While three (3) RACH configuration periods may be sufficient to hold all 36 actually transmitted SS-blocks, using the approach outlined above four (4) RACH configuration periods are needed. This provides advantages in reducing ambiguity regarding SSB to RACH mapping. In this example, therefore, the parameter x=2.

A similar example can be generated with a pre-specified time period rule as well. If, for example, the pre-specified time period were 20 ms, and if the 20 ms could hold only eight (8) RACH occasions, again this would result in the parameter x=2 such that the time period is $2^2 \times 20$ ms=80 ms to hold all SS-blocks.

For time division duplexing (TDD), RACH configurations may map RACH resources onto slots irrespective of the time locations of actually transmitted SS/PBCH blocks. In the case that an actually transmitted SS/PBCH block overlaps with a RACH resource within a RACH configuration period, the RACH resource may or may not be valid depending on pre-defined rules. For example, a rule may specify that any overlapping RACH resources are not valid. The rules may also be defined based on DL/UL switching points and the potential impact of semi-static DL/UL configuration and/or dynamic short file identifier (SFI). The rules may minimize the impact of the time location of the SS/PBCH block to the RACH configuration design.

A base station 105 may not transmit a maximum number of SS-blocks during an SS burst set. Since the UE 110 receives only a subset of the SS-blocks 154, the UE 110 may be unaware of which SS-blocks 154 were actually transmitted. The base station 105 may signal the actually transmitted SS-blocks in the remaining minimum system information (RMSI) 176. The RMSI 176 may carry a compressed indication of which SS-blocks 154 were transmitted. In an implementation, for example, the RMSI 176 may include a first bitmap indicating which groups of SS-blocks 154 are transmitted and a second bitmap indicating which SS-blocks 154 are actually transmitted within the group. A group may be defined as consecutive SS/PBCH blocks. Each group may have the same pattern of SS/PBSCH block transmission.

At least for initial access (e.g., Msg1) the association between SS-blocks 154 and PRACH resources 158 (e.g., PRACH preamble indices) may be based on the actually transmitted SS-blocks 154 indicated in the RMSI 176. The base station 105 may configure the number PRACH resources 158 or PRACH preambles for the actually transmitted SS-blocks 154.

In an aspect, each RACH configuration period 442 may not contain PRACH resources 158 for an integer number of SS-blocks 154. Some PRACH resources 158 may be left over after each transmitted SS-block 154 has been mapped to PRACH resources 158 within a RACH configuration period. The left over PRACH resources 158 may be used for RACH messages or for other purposes. The base station 105 and the UE 110, however, may need to agree on how the left over RACH resources are to be used. A mapping rule 156 may define how the left over or remaining RACH resource should be mapped to transmissions.

Figure 4:
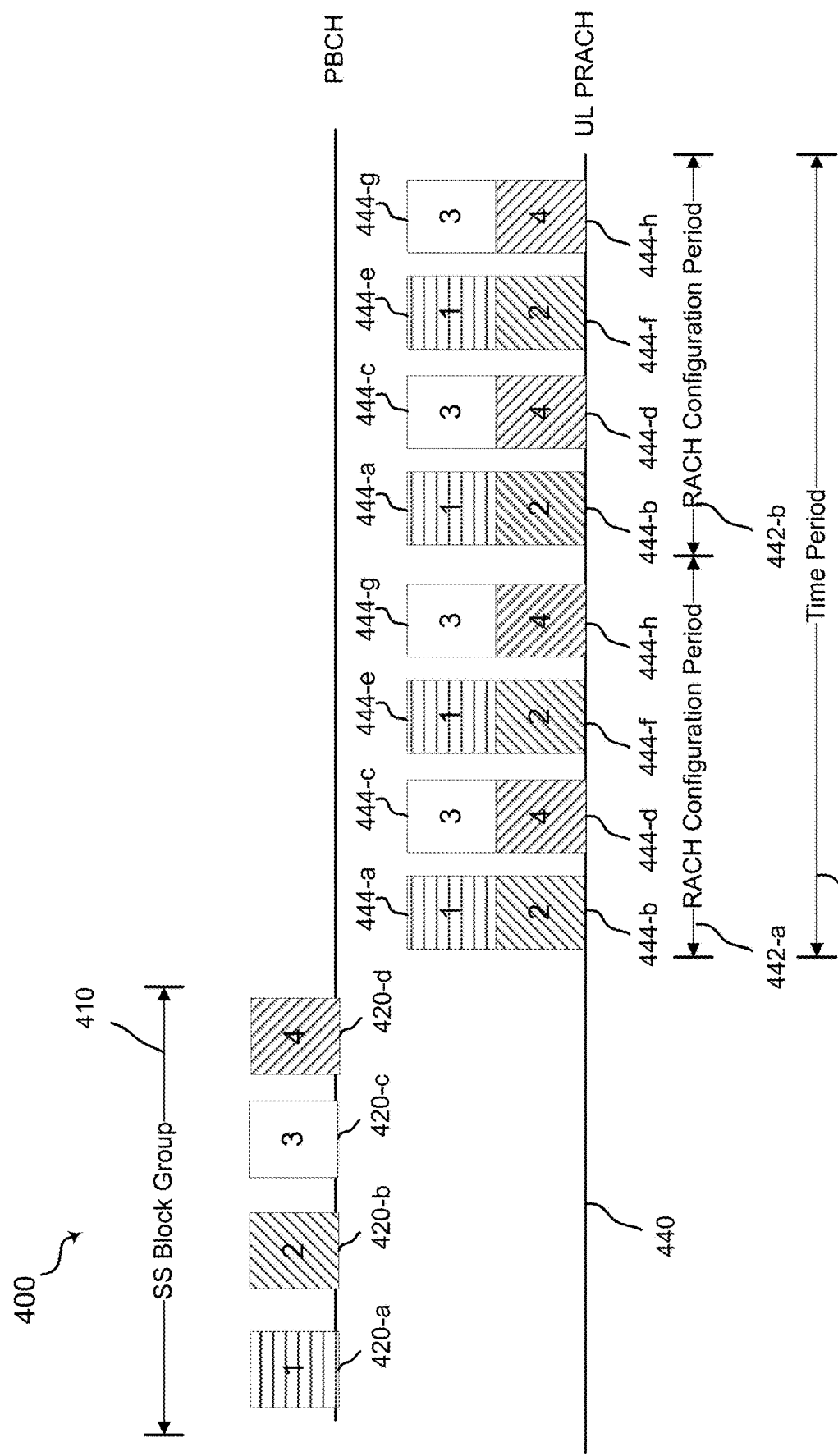
FIG. 4 is a conceptual diagram of an example RACH timeline for a first scenario.

Referring now to FIG. 4, in a scenario 400, SS-blocks 420-a, 420-b, 420-c, and 420-d may be transmitted in the downlink on a PBCH. As discussed above, the SS-blocks 420-a, 420-b, 420-c, and 420-d may be organized into an SS-block group 410, for example, the SS-block group 410 is illustrated as including 4 SS-blocks 420-a, 420-b, 420-c, and 420-d, but another number of SS-blocks may be used. The UL PRACH 440 may include a number of RACH configuration periods 442-a and 442-b. Each RACH configuration period 442-a, 442-b may include a repeated pattern of PRACH resources 444-a, 444-b, 444-c, 444-d, 444-e, 444-f, 444-g, and 444-h. For example, as illustrated, each RACH configuration period 442-a, 442-b may include the pattern of 8 PRACH resources 444-a, 444-b, 444-c, 444-d, 444-e, 444-f, 444-g, and 444-h divided into 4 PRACH time/frequency transmission occasions each including 2 PRACH resources. For example, a first transmission occasion may include PRACH resources 444-a and 444-b, a second transmission occasion may include PRACH resources 444-c and 444-d, a third transmission occasion may include PRACH resources 444-e and 444-f, and a fourth transmission occasion may include PRACH resources 444-g and 444-h. In an aspect, the PRACH resources 444-a, 444-b, 444-c, 444-d, 444-e, 444-f, 444-g, and 444-h may be groups of RACH preambles that may be selected during a PRACH transmission occasion. For example, each PRACH resource 444-a, 444-b, 444-c, 444-d, 444-e, 444-f, 444-g, and 444-h may represent a group of 32 RACH preambles assigned to an SS-block from which a UE may select for transmitting a RACH message. In this example, since the number of PRACH resources 444-a, 444-b, 444-c, 444-d, 444-e, 444-f, 444-g, and 444-h is an integer multiple of the number of SS-blocks 420-a, 420-b, 420-c, and 420-d, each SS-block 420-a, 420-b, 420-c, and 420-d may be mapped to the integer number (e.g., 2) of the PRACH resources 444-a, 444-b, 444-c, 444-d, 444-e, 444-f, 444-g, and 444-h. Accordingly, scenario 400 may not include any remaining RACH resources. If, for example, a RACH configuration period 442-a or 442-b does not include sufficient PRACH resources 444 corresponding to the number of SS-blocks 420, a time period 452 may be used. The time period 452 may be a multiple of a preconfigured time period (e.g., RACH configuration period 442). For example, the time period 452 may have a duration of $2^x \times$the RACH configuration period 442, or anther pre-defined time period, as discussed above.

Figure 5:
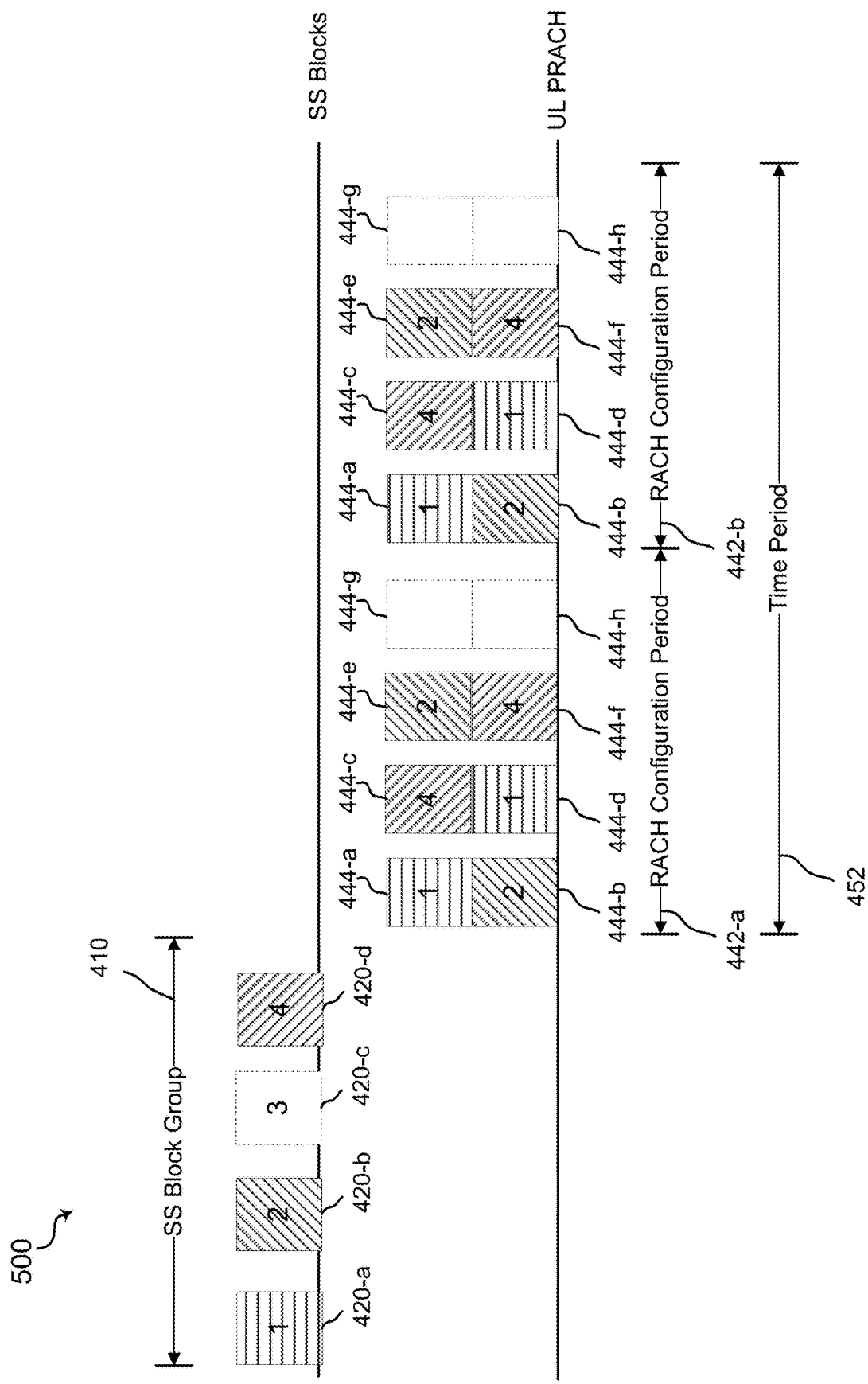
FIG. 5 is a conceptual diagram of an example RACH timeline for a second scenario.

Turning now to FIG. 5, in a scenario 500, SS-blocks 420-a, 420-b, 420-d may be transmitted in the downlink on a PBCH, but the base station may not transmit all of the SS-blocks in the SS-block group 410. For example, the SS-block 420-c may not be transmitted. Since the SS-block 420-c is not transmitted, an UL PRACH resource corresponding to SS-block 420-c is not needed because no UE would select a corresponding resource without receiving the SS-block 420-c. The number of PRACH resources 444 within the RACH configuration period 442 or time period 452, however, remains the same. Since only three SS-blocks 420-a, 420-b, 420-d were transmitted, each transmitted SS-block 420-a, 420-b, 420-d may be mapped to PRACH resources 444 such that each SS-block 420-a, 420-b, 420-d is associated with two of PRACH resources 444-a, 444-b, 444-c, 444-d. 444-e, 444-f. This mapping, however, leaves two PRACH resources (e.g., 444-g and 444-h) unassigned because the number of transmitted SS-blocks 420 is not an integer multiple of the number of PRACH resources 444. Although the unassigned PRACH resources 444-g and 444-h are illustrated at the end of the RACH configuration period 442, other mappings are possible. For example, the same mapping as illustrated in FIG. 4 may be used and the unassigned PRACH resources may be 444-c and 444-g.

In an aspect, the unassigned PRACH resources 444-g and 444-h may be used for purposes other than PRACH. For example, the base station may schedule regular UL/DL data using the PRACH resources 444-g and 444-h. That is, the PRACH resources 444-g and 444-h may carry, for example, a physical uplink shared channel (PUSCH) or a physical downlink shared channel (PDSCH). In an aspect, a mapping that groups unassigned PRACH resources together (e.g., at the end of RACH configuration period 242) may facilitate scheduling data by keeping resource element groups intact. As another example, the UE may utilize the unassigned PRACH resources 444-g and 444-h for antenna calibration and/or maximum permissible exposure (MPE) detection purposes.

Figure 6:
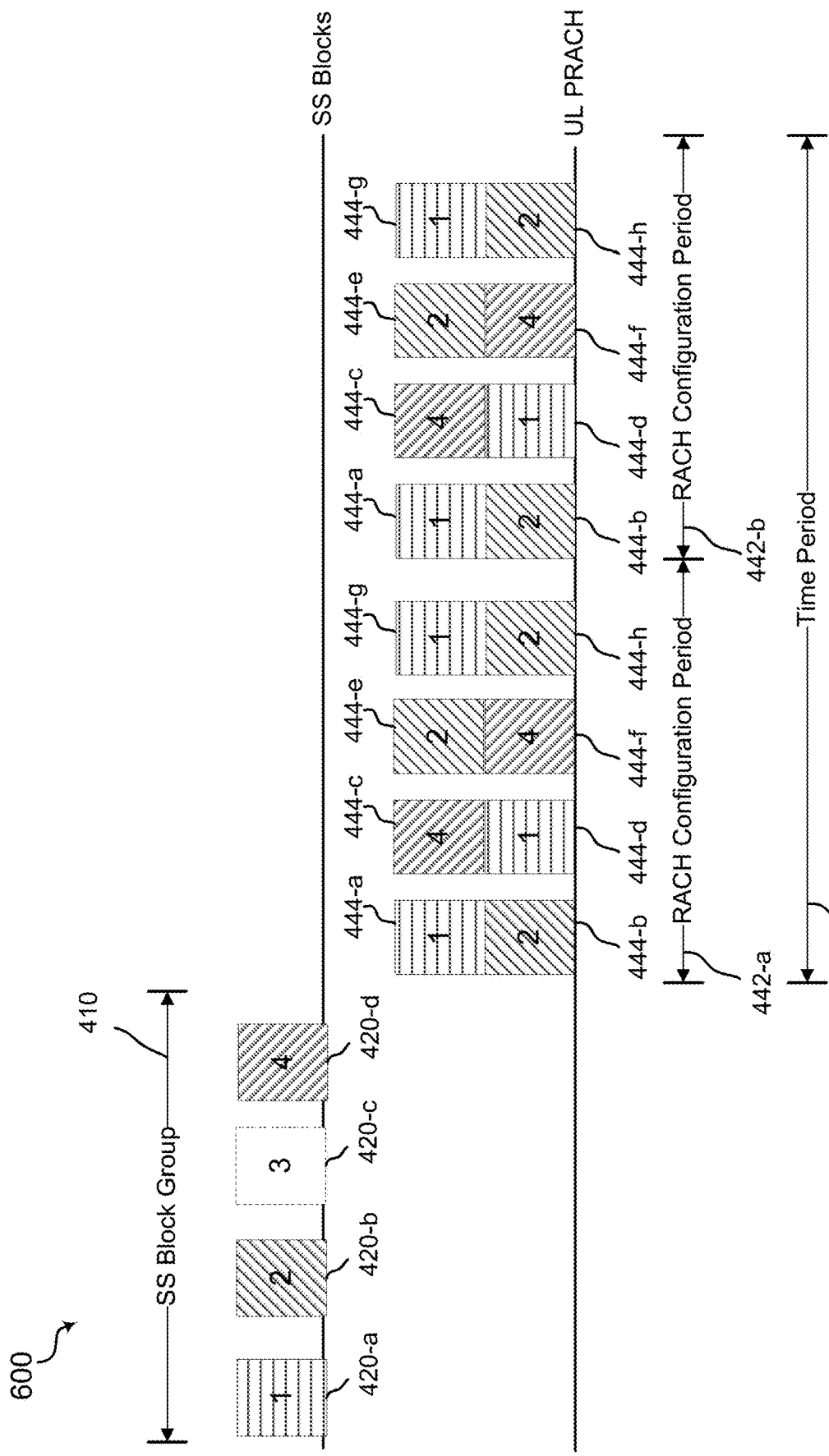
FIG. 6 is a conceptual diagram of an example RACH timeline for a third scenario.

Turning to FIG. 6, in a scenario 600, SS-blocks 420-a, 420-b, 420-d may be transmitted in the downlink on a PBCH, but the base station may not transmit all of the SS-blocks in the SS-block group 410. For example, as in scenario 500, the SS-block 420-*c* may not be transmitted. Due to the number of PRACH resources 444 not being an integer multiple of the number of SS-blocks 420-*a*, 420-*b*, 420-*d*, two PRACH resources (e.g., 444-*g* and 444-*h*) may be unassigned.

In an aspect, the unassigned PRACH resources 444-*g* and 444-*h* may be assigned to a subset of the actually transmitted SS-blocks. For example, the configured resource mapping pattern may be repeated to the extent possible using the unassigned PRACH resources 444-*g* and 440-*h*. In the illustrated example, unassigned PRACH resource 444-*g* may be mapped to SS-block 420-*a* and unassigned PRACH resource 444-*h* may be mapped to SS-block 420-*b*. Accordingly, SS-blocks 420 located at the beginning of the SS burst set may receive additional PRACH transmission occasions resulting in a greater frequency of transmission occasions. The configured resource mapping pattern may be repeated for each RACH configuration period. Accordingly, although the PRACH resource 444-*g* is mapped to SS-block 420-*a* at the end of the RACH configuration period 442-*a*, the PRACH resource 444-*a* at the beginning of RACH configuration period 442-*b* may also be mapped to SS-block 420-*a*. The consistent use of the configured resource mapping pattern in every RACH configuration period 442 may allow a UE to determine the correct PRACH resources in any RACH configuration period 442 regardless of a state of the previous RACH configuration period 442.

Figure 7:
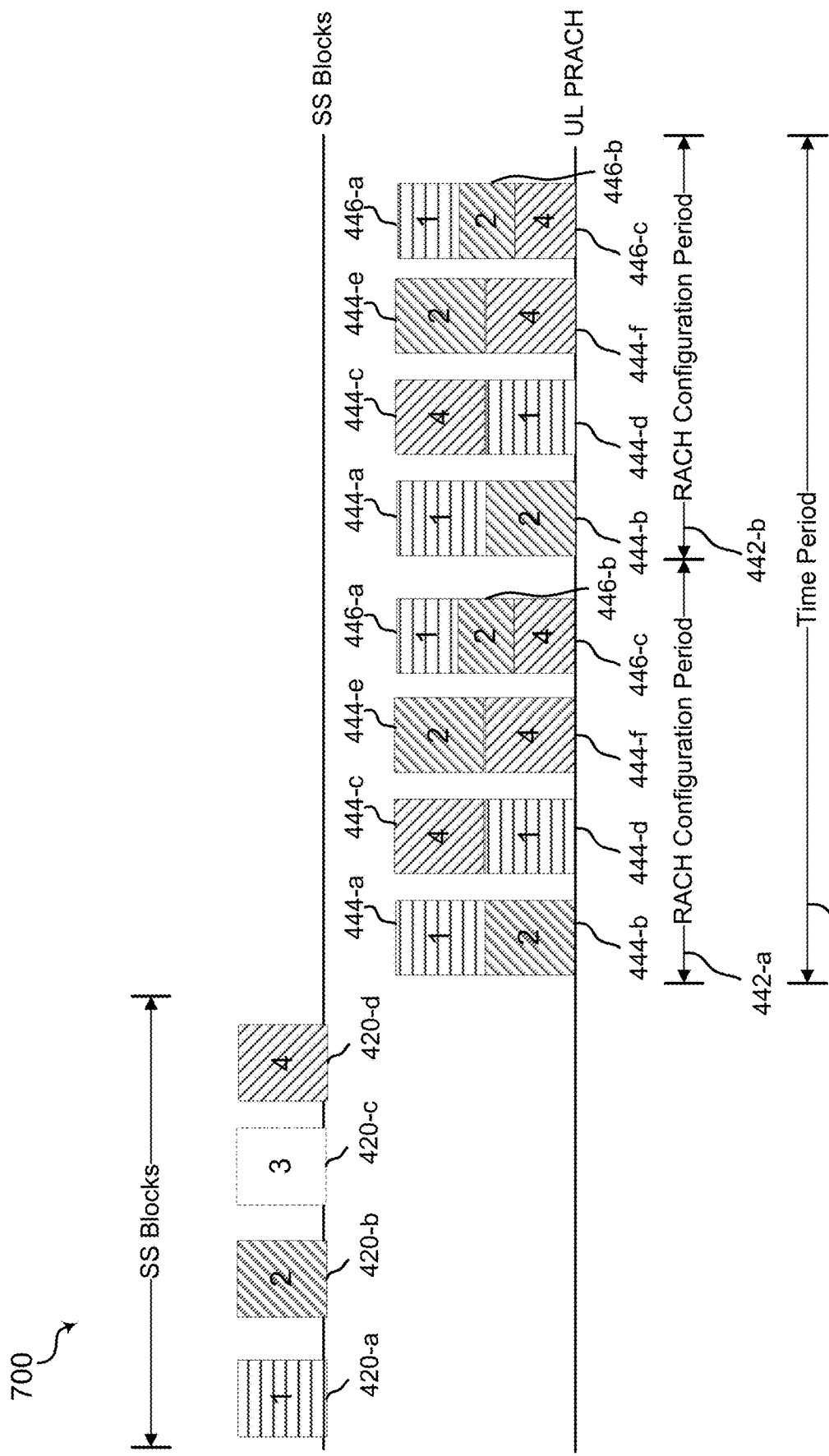
FIG. 7 is a conceptual diagram of an example RACH timeline for a fourth scenario.

Turning to FIG. 7, in a scenario 700, SS-blocks 420-*a*, 420-*b*, 420-*d* may be transmitted in the downlink on a PBCH, but the base station may not transmit all of the SS-blocks in the SS-block group 410. For example, as in scenario 500, the SS-block 420-*c* may not be transmitted. Due to the number of PRACH resources 444 not being an integer multiple of the number of SS-blocks 420-*a*, 420-*b*, 420-*d*, two PRACH resources (e.g., 444-*g* and 444-*h*) may be unassigned.

In an aspect, the unassigned PRACH resources 444-*g* and 444-*h* may be assigned to all of the transmitted SS-blocks 420-*a*, 420-*b*, 420-*d*. As discussed above, the PRACH resources 444 may include groups of PRACH preambles that may be assigned to each SS-block 420. Although the PRACH configuration may specify a number of PRACH preambles for each SS-block, the unassigned PRACH resources 444-*g* and 444-*h* may be assigned more equally by mapping a smaller number of PRACH preambles to each SS-block in the unassigned resources. For example, if there are 64 PRACH preambles available in each PRACH transmission occasion and each PRACH resource 444 typically includes 32 PRACH preambles for each SS-block, the 64 PRACH preambles may instead be divided into smaller PRACH resources 446, each including 21 PRACH preambles for each SS-block. However, a number of supported PRACH preambles within the time period (e.g., transmission occasion) may not be an integer multiple of the product of the first number of reference signals (e.g., SS-blocks) and the number of PRACH preamble indices per reference signal. In this example, the number of reference signals is 3 and the number of PRACH preamble indices per reference signal is 21, so the product is 63. The 64 PRACH preambles per transmission occasion is not an integer multiple of 63. One of the smaller PRACH resources 446 may include an additional PRACH preamble if the number of preambles is not an integer multiple of the number of transmitted SS-blocks, or any remaining PRACH preambles may remain unassigned.

Figure 8:
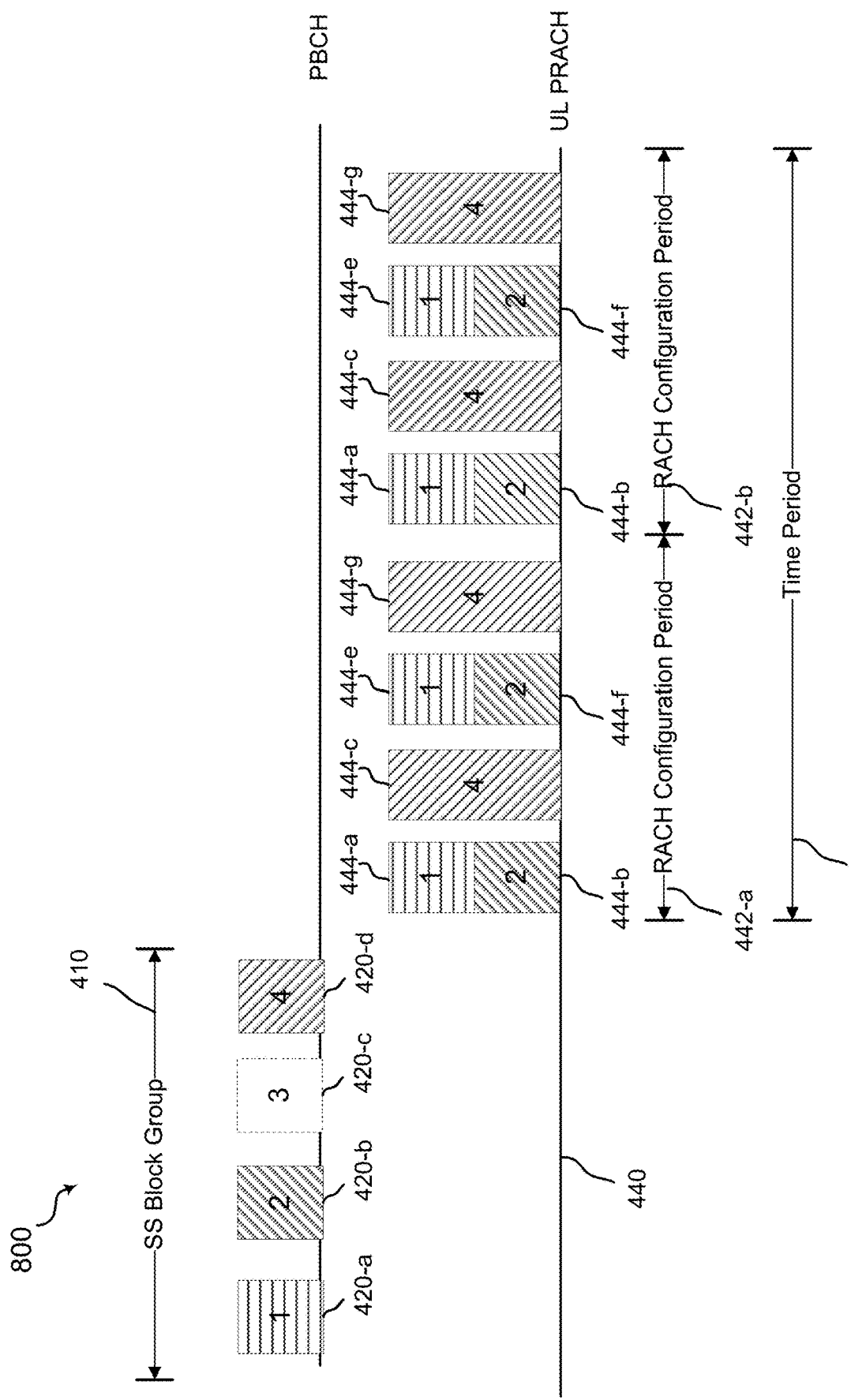
FIG. 8 is a conceptual diagram of an example RACH timeline for a fifth scenario.

Turning to FIG. 8, in a scenario 800, SS-blocks 420-*a*, 420-*b*, 420-*d* may be transmitted in the downlink on a PBCH, but the base station may not transmit all of the SS-blocks in the SS-block group 410. For example, as in scenario 500, the SS-block 420-*c* may not be transmitted. Due to the number of PRACH resources 444 not being an integer multiple of the number of SS-blocks 420, two PRACH resources (e.g., 444-*g* and 444-*h*) may be unassigned.

In an aspect, the unassigned PRACH resources 444-*g* and 444-*h* may be assigned to a single transmitted SS-block 420 (e.g., SS-block 420-*d*). That is, the SS-block 420-*d* may be allocated an entire PRACH transmission opportunity without FDM with a second SS-block. Accordingly, more PRACH resources may be available to UEs that select SS-block 420-*d*. In an aspect, the mapping rule 156 may be configured to select an SS-block that In an aspect, one or more mapping rules may be pre-defined, for example, in a standards document. If more than one rule is defined, the base station may signal which mapping rule should be applied. For example, the base station may signal an index identifying one of the predefined mapping rules. For instance, a mapping rule may be defined for each of the scenarios 400, 500, 600, 700, 800. For example, the base station may signal the mapping rule in the RMSI alone with the number of SS-blocks actually transmitted. Alternatively, the base station may signal the mapping rule using one or more of: system information blocks (SIB), management information block (MIB) via PBCH, handover messages, radio resource control (RRC) signaling, downlink control information (DCI), or one or more combinations of PSS, SSS, and demodulation reference signal (DMRS) on PBCH.

In an aspect, the base station may provide different mapping rules to different UEs. For example, the unassigned PRACH resources may be unusable for initial access UEs, which perform contention based random access, but UEs that perform contention free random access may be provisioned with a different mapping rule that allows use of the unassigned PRACH resources. The base station may define different mapping rules based on UE categories. The mapping rules may map an SS-block to a different number of PRACH resources. In the example above, unconnected UEs may be a first category and connected UEs may be a second category. As another example, relay stations or drone UEs that are unlikely to generate RACH messages may be considered a first category of UE and devices such as mobile phones may be considered a second category of UE. SS-blocks associated with the first group of UEs may be mapped to one PRACH resource while SSBs associated with the second group of UEs may be mapped to multiple PRACH resources.

Figure 9:
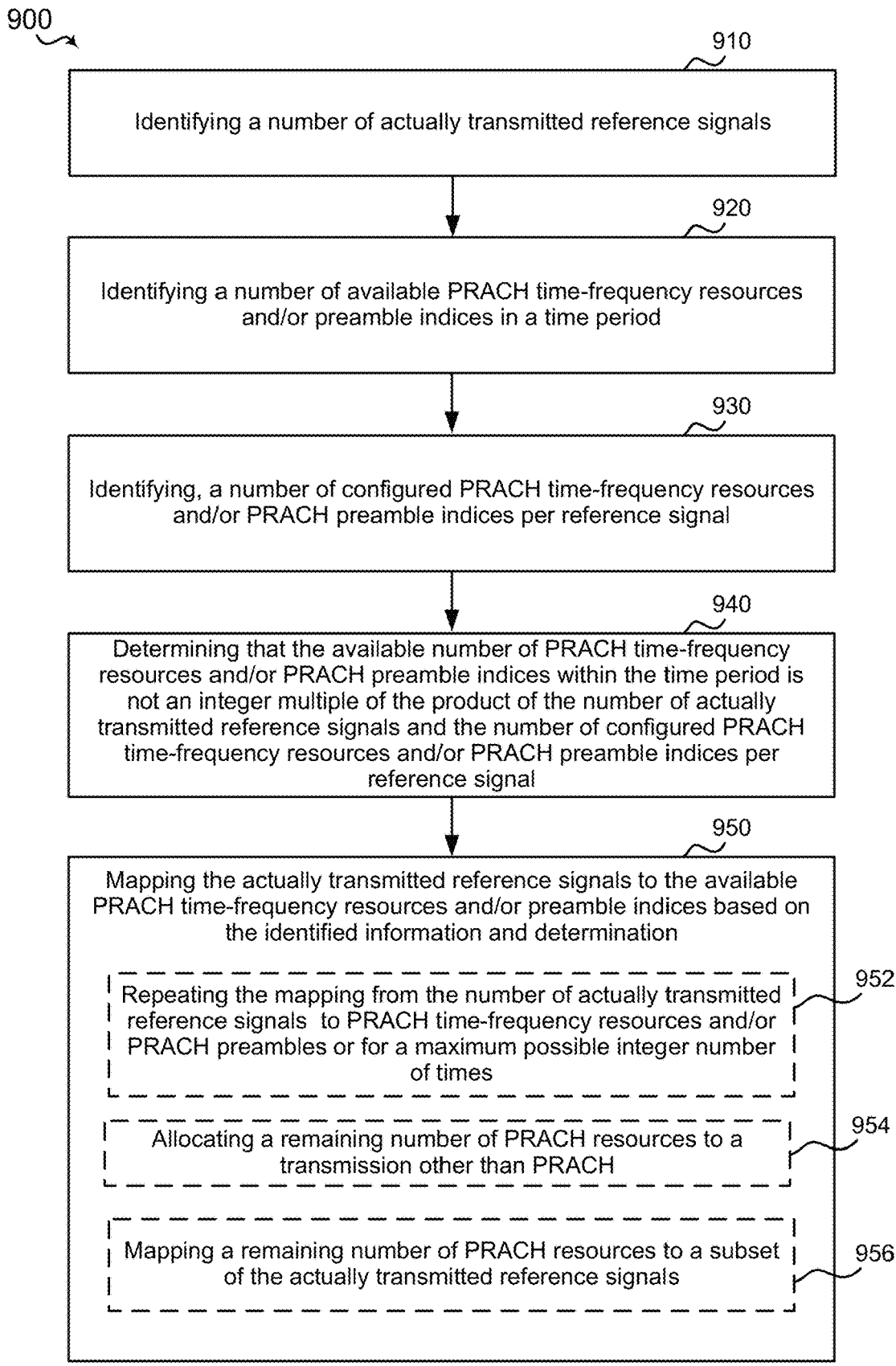
FIG. 9 is a flow diagram of an example method for mapping reference signals to PRACH resources.
Figure 10:
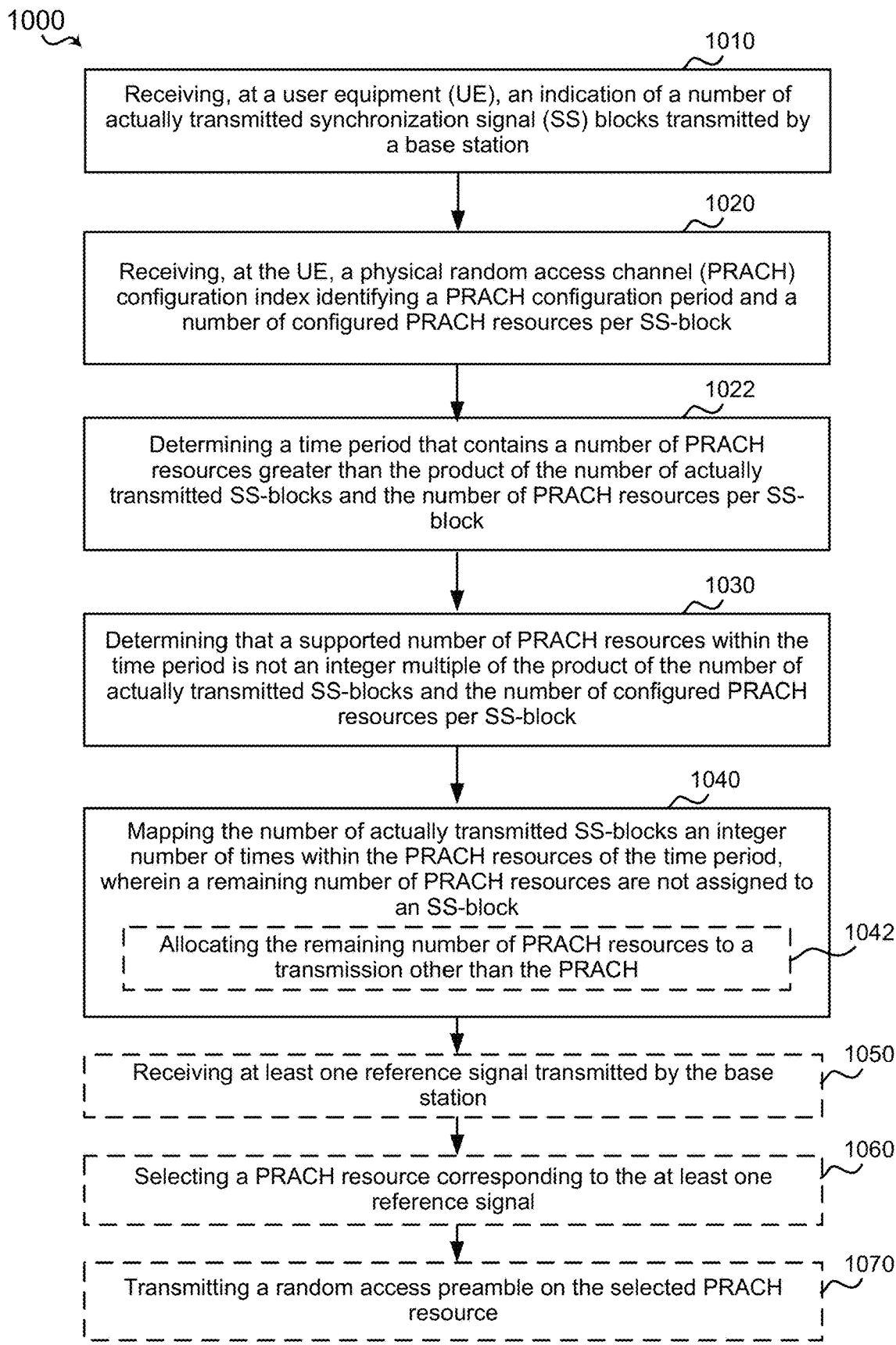
FIG. 10 is a flow diagram of an example of a method for a UE to map synchronization signal blocks to RACH resources.

Referring to FIG. 9, for example, a method 900 of wireless communication in operating a first node according to the above-described aspects for mapping reference signals to PRACH resources includes one or more of the below-defined actions. The first node may be, for example, a UE or a relay station.

For example, at 910, method 900 includes identifying a number of actually transmitted reference signals. In an aspect, for example, the RACH controller component 150 may identify the number of actually transmitted reference signals. The reference signal may be one of a synchronization signal (e.g., SS-blocks-154), or channel state information reference signal (CSI-RS), or the like. The number of actually transmitted reference signals may be less than a maximum number of reference signals.

At 920, method 900 may include identifying a number of available PRACH time-frequency resources and/or preamble indices in a time period. In an aspect, for example, the RACH controller component 150 may identify a number of available time-frequency PRACH resources 444 and/or preamble indices in a time period. In an aspect, the time period may be equal to a RACH configuration period. The PRACH time-frequency resource may denote a RACH transmission occasion. In another aspect, the time period may be equal to the duration of one RACH transmission occasion. In another aspect, the time period may be a minimum amount of time duration that contains sufficient preamble indices corresponding to all actually transmitted reference signals.

At 930, method 900 may include identifying, a number of configured PRACH time-frequency resources and/or PRACH preamble indices per reference signal. In an aspect, for example, the RACH controller component 150 may identify the number of configured PRACH time-frequency resources and/or PRACH preamble indices per reference signal. For example, the RACH controller component 150 may receive the number of configured PRACH time-frequency resources and/or PRACH preamble indices per reference signal in the RACH configuration provided by the PRACH configuration index 174.

At 940, method 900 may include determining that the available number of PRACH time-frequency resources and/or PRACH preamble indices within the time period is not an integer multiple of the product of the number of actually transmitted reference signals and the number of configured PRACH time-frequency resources and/or PRACH preamble indices per reference signal. In an aspect, for example, the RACH controller component 150 may determine that the available number of time-frequency PRACH resources 444 or PRACH preambles within the time period 452 or RACH configuration period 442 is not an integer multiple of the product of the number of actually transmitted reference signals and the number of configured PRACH time-frequency resources and/or PRACH preamble indices per reference signal.

At 950, the method 900 may include mapping the actually transmitted reference signals to the available PRACH time-frequency resources and/or preamble indices based on the identified information and determination. In an aspect, for example, the RACH controller component 150 may map the actually transmitted reference signals to the available time-frequency PRACH resources 444 and/or preamble indices based on the identified information and determination using, for example, the mapping rule 156. The mapping may be based on a pre-defined mapping rule. The mapping may be based on a mapping rule signaled by a second node, e.g., a base station. The mapping rule may be signaled via remaining minimum system information, a master information block received via a physical broadcast channel, other system information, a handover message, radio resource control signaling, downlink control information, or a combination of primary synchronization signal, secondary synchronization signal, and a demodulation reference signal received via the physical broadcast channel, just to name a few examples.

The mapping may include, at 952, repeating the mapping from the number of actually transmitted reference signals to PRACH time-frequency resources and/or PRACH preamble indices for a maximum possible integer number of times. The mapping may include, at 954, allocating a remaining number of PRACH resources to a transmission other than PRACH. The transmission other than the PRACH may be one of a physical uplink shared channel, physical downlink shared channel, antenna calibration, or MPE detection. The mapping may include, at 956, mapping a remaining number of PRACH resources to a subset of the actually transmitted reference signals. The mapping may be in an order indicated by the PRACH configuration index. The actually transmitted reference signals may be allocated an unequal number of PRACH resources. The number of PRACH resources or PRACH preamble indices mapped to each reference signal in the remaining number of PRACH resources or PRACH preamble indices may be smaller than a number of PRACH resources or PRACH preamble indices that is mapped to reference signals through a repeated pattern Referring to FIG. 10, for example, a method 1000 of wireless communication in operating a UE 110 according to the above-described aspects to transmit a RACH message includes one or more of the below-defined actions.

For example, at 1010, method 1000 includes receiving, at a UE, an indication of a number of actually transmitted SS-blocks transmitted by a base station. For instance, in an aspect, the UE 110 may execute RACH controller component 150 to receive an indication of a number of actually transmitted SS-blocks transmitted by a base station, as described herein. For example, the indication may be the RMSI 176. The number of actually transmitted SS-blocks may be less than a maximum number of SS-blocks.

At 1020, method 1000 includes receiving, at the UE, a PRACH configuration index identifying a RACH configuration period and a number of configured PRACH resources per SS-block. In an aspect, for example, the UE 110 may execute RACH controller component 150 to receive the PRACH configuration index 174 identifying the RACH configuration period 442 and a number of configured PRACH resources per SS-block.

At 1022, method 1000 includes determining a time period that contains a number of PRACH resources greater than the product of the number of actually transmitted SS-blocks and the number of PRACH resources per SS-block. In an aspect, for example, the UE 110 may execute RACH controller component 150 to determine a time period that contains a number of PRACH resources greater than the product of the number of actually transmitted SS-blocks and the number of PRACH resources per SS-block.

At 1030, the method 1000 includes determining that a supported number of PRACH resources within the time period is not an integer multiple of the product of the number of actually transmitted SS-blocks and the number of configured PRACH resources per SS-block. In an aspect, for example, the UE 110 may execute RACH controller component 150 to determine that a supported number of PRACH resources within the RACH configuration period is not an integer multiple of the product of the number of actually transmitted SS-blocks and the number of configured PRACH resources per SS-block. For example, the RACH controller component 150 may perform a modulus operation on the product of the number of actually transmitted SS-blocks and the number of configured PRACH resources per SS-block. A modulus greater than 0 may indicate a number of remaining PRACH resources.

At 1040, the method 1000 includes mapping the number of actually transmitted SS-blocks an integer number of times within the PRACH resources of the time period, wherein a remaining number of PRACH resources are not assigned to an SS-block. In an aspect, for example, the UE 110 may execute RACH controller component 150 to map the number of actually transmitted SS-blocks an integer number of times within the PRACH resources of the time period, wherein a remaining number of PRACH resources are not assigned to an SS-block. The RACH controller component 150 may utilize the mapping rule 156 to map the PRACH resources to one or more transmissions. For example, at 1042, the mapping may include allocating the remaining number of PRACH resources to a transmission other than the PRACH. For example, the transmission other than the PRACH may be one of PUSCH, PDSCH, antenna calibration, or MPE detection.

At 1050, the method 1000 may optionally include receiving at least one reference signal transmitted by the base station. In an aspect, for example, the UE 110 may execute RACH controller component 150 to receive the at least one reference signal (e.g., SS-block 154) transmitted by the base station 105.

At 1060, the method 1000 may optionally include selecting a PRACH resource corresponding to the at least one reference signal. In an aspect, for example, the UE 110 may execute RACH controller component 150 to select a PRACH resource 158 corresponding to the at least one reference signal (e.g., SS-block 154). For instance, the RACH controller component 150 may use the mapping rule 156 to determine the PRACH resource 158 corresponding to a best received SS-block 154.

At 1070, the method 1000 may include transmitting a random access preamble on the selected PRACH resource. In an aspect, for example, the UE 110 may execute RACH controller component 150 to transmit the random access preamble on the selected PRACH resource 158. The random access preamble may be selected from the group of PRACH preambles associated with the selected PRACH resource 158.

Figure 11:
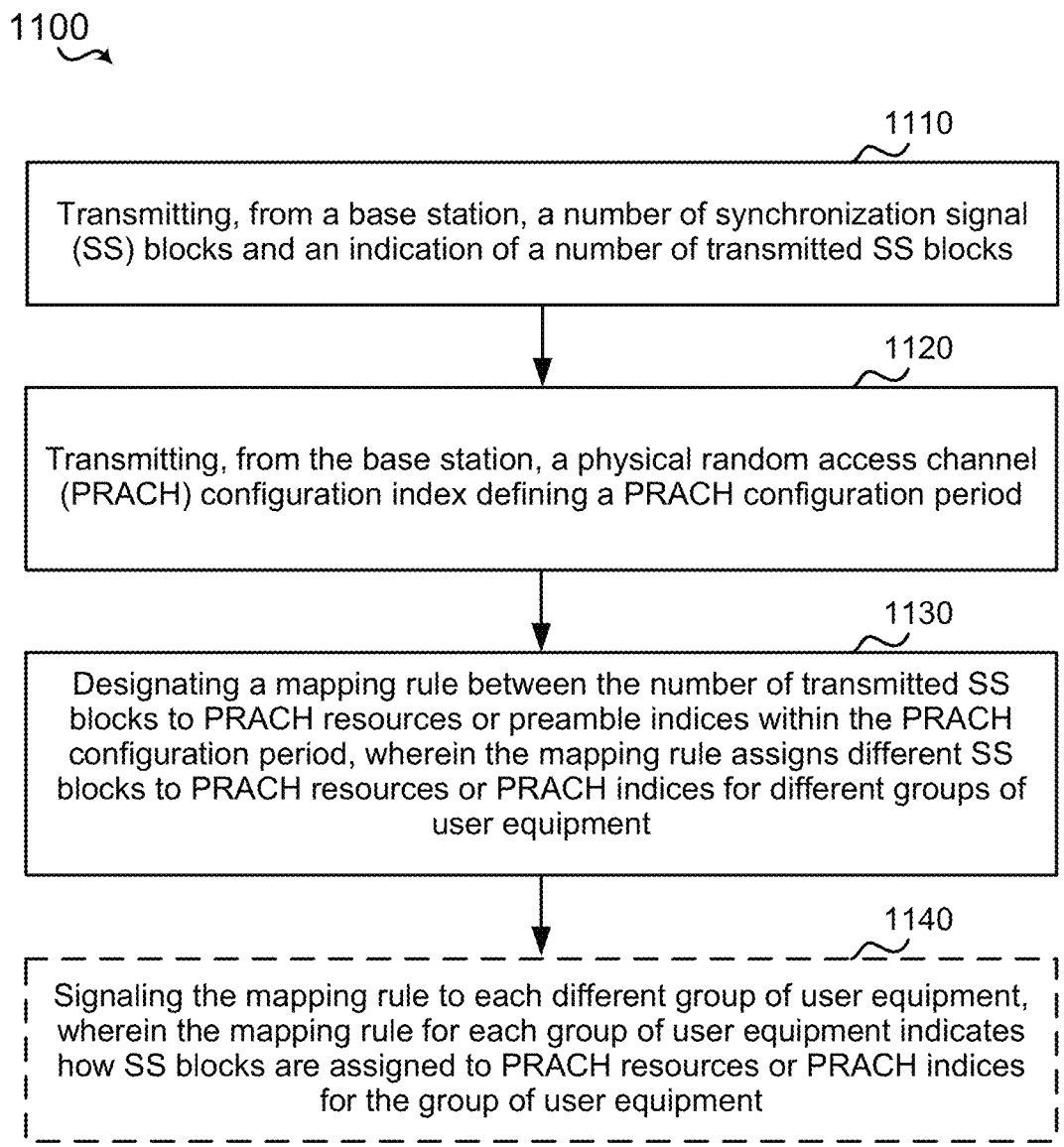
FIG. 11 is a flow diagram of an example of a method for a base station to map synchronization signal blocks to RACH resources.

Referring to FIG. 11, for example, a method 1100 of wireless communication in operating a base station 105 according to the above-described aspects to receive a RACH message includes one or more of the below-defined actions.

At 1110, the method 1100 includes transmitting, from a base station, a number of SS-blocks and an indication of the number of transmitted SS-blocks. In an aspect, for example, the base station 105 may execute the RACH component 170 to transmit the number of SS-blocks 420 and the indication of the number of transmitted SS-blocks. The indication may be the RMSI 176.

At 1120, the method 1100 includes transmitting, from the base station, a PRACH configuration index defining a RACH configuration period. In an aspect, for example, the base station 105 may execute the RACH component 170 to transmit the PRACH configuration index 174 defining the RACH configuration period 442. The RACH configuration period 242 may include a number of PRACH resources 444.

At 1130, the method 1100 includes designating a mapping rule between the number of transmitted SS-blocks to PRACH resources or preamble indices within the PRACH configuration period, wherein the mapping rule assigns different SS-blocks to PRACH resources or PRACH indices for different groups of user equipment. In an aspect, for example, the base station 105 may execute the RACH component 170 to designate the mapping rule 156 between the number of transmitted SS-blocks 420 to PRACH resources 444 or PRACH preambles within the RACH configuration period. The mapping rule 156 may assign different SS-blocks 420 to PRACH resources 444 or PRACH preamble indices for different groups of user equipment 110. The mapping may assign different ratios of SS-blocks to PRACH resources to the different groups of user equipment. For example, the mapping may assign a first number of preamble subsets per RACH resource for one group of UEs and a different second number of preamble subsets per RAC resource for a different group of UEs. The different groups of user equipment may be based on user equipment categories. Example UE categories may include relays, drone UEs, mobile phones, tablets, or wireless hubs.

At 1140, the method 1100 may optionally include signaling the mapping rule to each different group of user equipment, wherein the mapping rule for each group of user equipment indicates how SS-blocks are assigned to PRACH resources or PRACH preamble indices for the group of user equipment. In an aspect, for example, the base station 105 may execute the RACH component 170 to signal a mapping rule 156 to each different group of user equipment 110. The mapping rule 156 for each group of user equipment may indicate how SS-blocks are assigned to PRACH resources or PRACH preamble indices for the group of user equipment.

Figure 12:
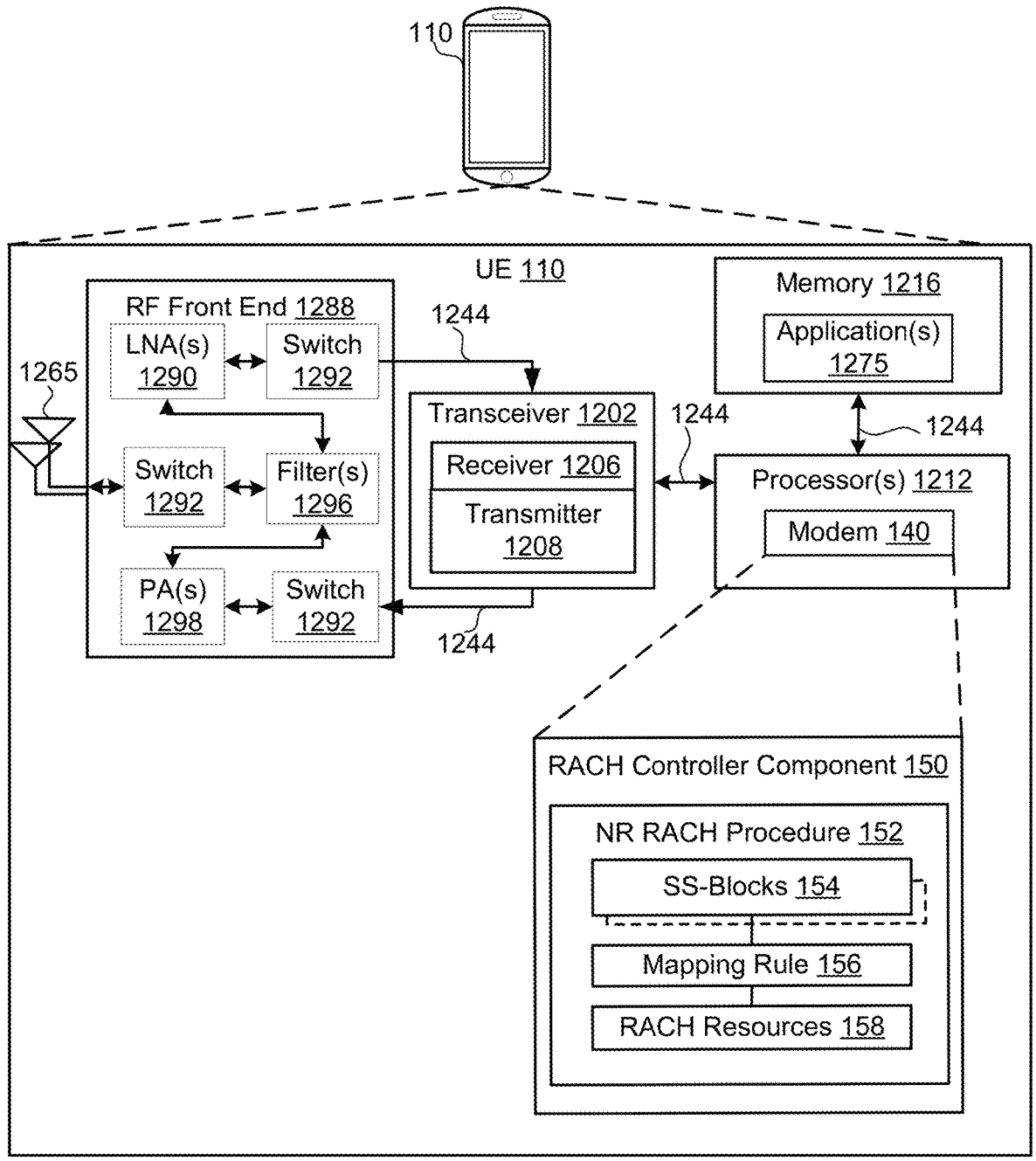
FIG. 12 is a schematic diagram of example components of the UE of FIG. 1.

Referring to FIG. 12, one example of an implementation of a UE 110 may include a variety of components, some of which have already been described above, but including components such as one or more processors 1212 and memory 1216 and transceiver 1202 in communication via one or more buses 1244, which may operate in conjunction with modem 140 and RACH controller component 150 to enable one or more of the functions described herein related to transmitting a RACH Msg1. Further, the one or more processors 1212, modem 1214, memory 1216, transceiver 1202, RF front end 1288 and one or more antennas 1286, may be configured to support voice and/or data calls (simultaneously or non-simultaneously) in one or more radio access technologies.

In an aspect, the one or more processors 1212 can include a modem 1214 that uses one or more modem processors. The various functions related to RACH controller component 150 may be included in modem 140 and/or processors 1212 and, in an aspect, can be executed by a single processor, while in other aspects, different ones of the functions may be executed by a combination of two or more different processors. For example, in an aspect, the one or more processors 1212 may include any one or any combination of a modem processor, or a baseband processor, or a digital signal processor, or a transmit processor, or a receiver processor, or a transceiver processor associated with transceiver 1202. In other aspects, some of the features of the one or more processors 1212 and/or modem 140 associated with RACH controller component 150 may be performed by transceiver 1202.

Also, memory 1216 may be configured to store data used herein and/or local versions of applications 1275 or RACH controller component 150 and/or one or more of its subcomponents being executed by at least one processor 1212. Memory 1216 can include any type of computer-readable medium usable by a computer or at least one processor 1212, such as random access memory (RAM), read only memory (ROM), tapes, magnetic discs, optical discs, volatile memory, non-volatile memory, and any combination thereof. In an aspect, for example, memory 1216 may be a non-transitory computer-readable storage medium that stores one or more computer-executable codes defining RACH controller component 150 and/or one or more of its subcomponents, and/or data associated therewith, when the UE 110 is operating at least one processor 1212 to execute RACH controller component 150 and/or one or more of its subcomponents.

Transceiver 1202 may include at least one receiver 1206 and at least one transmitter 1208. Receiver 1206 may include hardware, firmware, and/or software code executable by a processor for receiving data, the code comprising instructions and being stored in a memory (e.g., computer-readable medium). Receiver 1206 may be, for example, a radio frequency (RF) receiver. In an aspect, receiver 1206 may receive signals transmitted by at least one base station 105. Additionally, receiver 1206 may process such received signals, and also may obtain measurements of the signals, such as, but not limited to, Ec/Io, SNR, RSRP, RSSI, etc. Transmitter 1208 may include hardware, firmware, and/or software code executable by a processor for transmitting data, the code comprising instructions and being stored in a memory (e.g., computer-readable medium). A suitable example of transmitter 1208 may including, but is not limited to, an RF transmitter.

Moreover, in an aspect, the UE 110 may include RF front end 1288, which may operate in communication with one or more antennas 1265 and transceiver 1202 for receiving and transmitting radio transmissions, for example, wireless communications transmitted by at least one base station 105 or wireless transmissions transmitted by the UE 110. RF front end 1288 may be connected to one or more antennas 1265 and can include one or more low-noise amplifiers (LNAs) 1290, one or more switches 1292, one or more power amplifiers (PAs) 1298, and one or more filters 1296 for transmitting and receiving RF signals.

In an aspect, LNA 1290 can amplify a received signal at a desired output level. In an aspect, each LNA 1290 may have a specified minimum and maximum gain values. In an aspect, RF front end 1288 may use one or more switches 1292 to select a particular LNA 1290 and its specified gain value based on a desired gain value for a particular application.

Further, for example, one or more PA(s) 1298 may be used by RF front end 1288 to amplify a signal for an RF output at a desired output power level. In an aspect, each PA 1298 may have specified minimum and maximum gain values. In an aspect, RF front end 1288 may use one or more switches 1292 to select a particular PA 1298 and its specified gain value based on a desired gain value for a particular application.

Also, for example, one or more filters 1296 can be used by RF front end 1288 to filter a received signal to obtain an input RF signal. Similarly, in an aspect, for example, a respective filter 1296 can be used to filter an output from a respective PA 1298 to produce an output signal for transmission. In an aspect, each filter 1296 can be connected to a specific LNA 1290 and/or PA 1298. In an aspect, RF front end 1288 can use one or more switches 1292 to select a transmit or receive path using a specified filter 1296, LNA 1290, and/or PA 1298, based on a configuration as specified by transceiver 1202 and/or processor 1212.

As such, transceiver 1202 may be configured to transmit and receive wireless signals through one or more antennas 1265 via RF front end 1288. In an aspect, transceiver may be tuned to operate at specified frequencies such that the UE 110 can communicate with, for example, one or more base stations 105 or one or more cells associated with one or more base stations 105. In an aspect, for example, modem 140 can configure transceiver 1202 to operate at a specified frequency and power level based on the UE configuration of the UE 110 and the communication protocol used by modem 140.

In an aspect, modem 140 can be a multiband-multimode modem, which can process digital data and communicate with transceiver 1202 such that the digital data is sent and received using transceiver 1202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of the UE 110 (e.g., RF front end 1288, transceiver 1202) to enable transmission and/or reception of signals from the network based on a specified modem configuration. In an aspect, the modem configuration can be based on the mode of the modem and the frequency band in use. In another aspect, the modem configuration can be based on UE configuration information associated with the UE 110 as provided by the network during cell selection and/or cell reselection.

Figure 13:
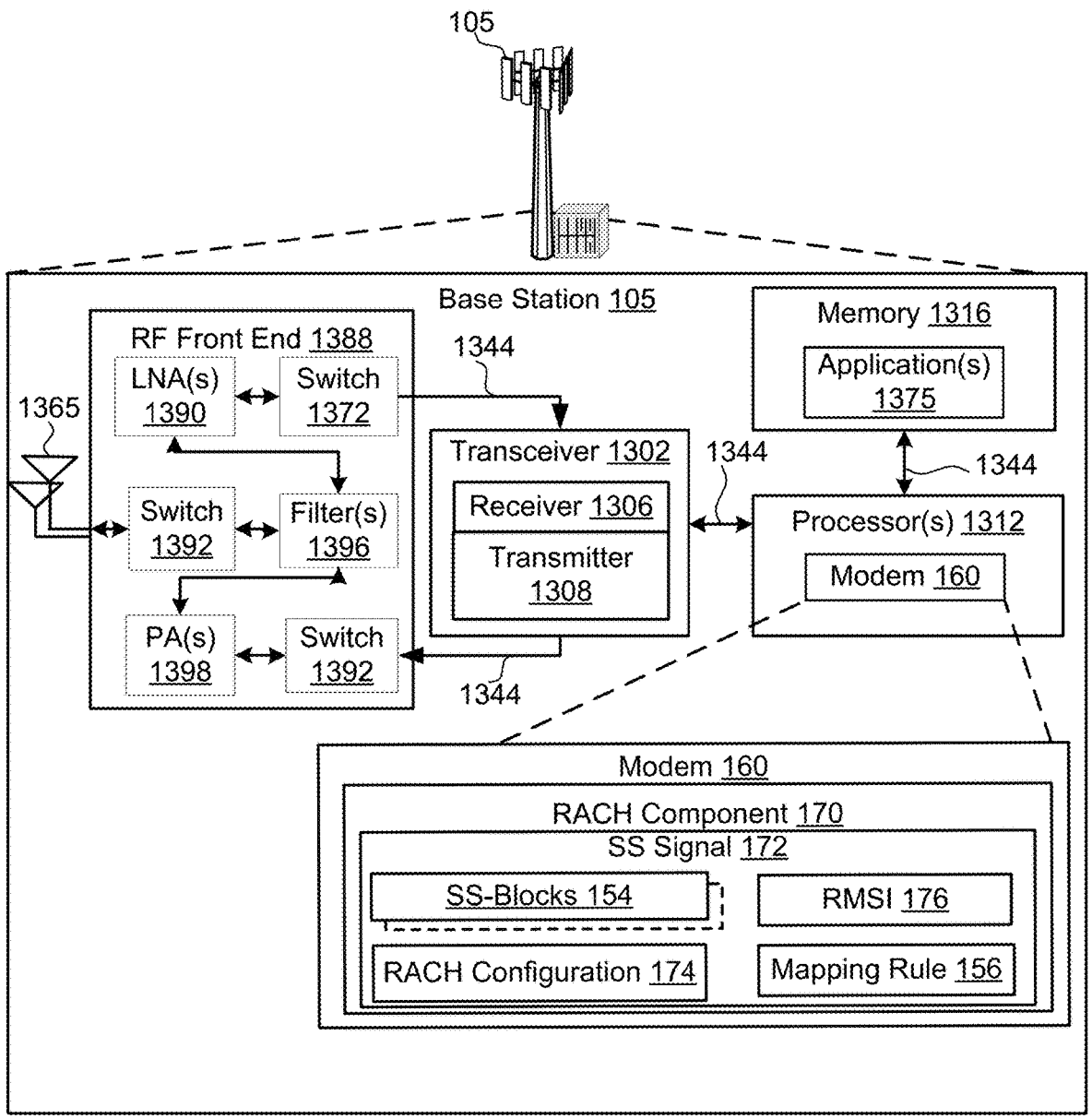
FIG. 13 is a schematic diagram of example components of the base station of FIG. 1.

Referring to FIG. 13, one example of an implementation of a base station 105 may include a variety of components, some of which have already been described above, but including components such as one or more processors 1312 and memory 1316 and transceiver 1302 in communication via one or more buses 1344, which may operate in conjunction with modem 160 and RACH component 170 to enable one or more of the functions described herein related to configuring a UE 110 for transmitting a RACH Msg1 and/or receiving the RACH Msg1.

The transceiver 1302, receiver 1306, transmitter 1308, one or more processors 1312, memory 1316, applications 1375, buses 1344, RF front end 1388, LNAs 1390, switches 1392, filters 1396, PAs 1398, and one or more antennas 1365 may be the same as or similar to the corresponding components of the UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications at a first node, comprising:
    identifying information comprising a number of actually transmitted reference signals, a number of available physical random access channel (PRACH) time-frequency resources in a time period, and a number of configured PRACH time-frequency resources per reference signal;
    determining that the available number of PRACH time-frequency resources within the time period is not an integer multiple of the product of the number of actually transmitted reference signals and the number of configured PRACH time-frequency resources per reference signal; and
    mapping the actually transmitted reference signals to the available PRACH time-frequency resources based on the identified information and in response to the determination.

2. The method of claim 1, wherein the time period is defined as $2^x$ multiplied by a pre-specified time period, wherein x is a non-negative integer.

3. The method of claim 2, wherein the pre-specified time period is one of 10 ms, 20 ms, 40 ms, 80 ms or 160 ms.

4. The method of claim 2, wherein x is a minimum, non-negative integer that allows one full mapping from all actually transmitted synchronization signal blocks to PRACH time-frequency resources in one time period.

5. The method of claim 1, wherein the time period is defined as $2^x$ multiplied by a network configured time period, wherein x is a minimum, non-negative integer that allows mapping from all actually transmitted synchronization signal blocks to PRACH time-frequency resources in one time period.

6. The method of claim 5, wherein the network configured time period is equal to a RACH configuration period.

7. The method of claim 5, wherein the network configured time period is configured using one or more of a master information block (MIB), a remaining minimum system information (RMSI), a broadcast other system information (OSI), a handover message, an RRC message, a MAC-CE, or a downlink control information (DCI).

8. The method of claim 1, wherein the reference signal is a synchronization signal block.

9. The method of claim 1, wherein the first node comprises a UE.

10. The method of claim 1, wherein the time period is equal to a RACH configuration period.

11. The method of claim 1, wherein the PRACH time-frequency resource denotes a RACH transmission occasion.

12. The method of claim 1, wherein the time period is equal to a duration of one RACH transmission occasion.

13. The method of claim 1, wherein the time period is a minimum amount of time duration that contains sufficient preamble indices corresponding to all actually transmitted reference signals.

14. The method of claim 1, wherein the mapping comprises repeating the mapping from the number of actually transmitted reference signals to PRACH time-frequency resources for a maximum possible integer number of times.

15. The method of claim 14, wherein a remaining number of PRACH resources within the time period are not used for PRACH transmission.

16. The method of claim 15 wherein the mapping further comprises allocating a remaining number of PRACH resources to a transmission other than PRACH.

17. The method of claim 16, wherein the transmission other than the PRACH is one of a physical uplink shared channel, physical downlink shared channel, antenna calibration, or MPE detection.

18. The method of claim 14, wherein the mapping comprises mapping a remaining number of PRACH resources to a subset of the actually transmitted reference signals.

19. The method of claim 18, wherein the mapping is in an order indicated by the PRACH configuration index.

20. The method of claim 18, wherein the actually transmitted reference signals are allocated an unequal number of PRACH resources.

21. The method of claim 15, wherein the number of PRACH resources or PRACH preamble indices mapped to each reference signal in a remaining number of PRACH resources or PRACH preamble indices is less than a number of PRACH resources or PRACH preamble indices that is mapped to reference signals through repeating the mapping.

22. The method of claim 1, further comprising:
receiving at least one reference signal transmitted by a base station;
selecting a PRACH resource corresponding to the at least one reference signal; and
transmitting a random access preamble on the selected PRACH resource.

23. The method of claim 1, wherein the mapping is based on a pre-defined mapping rule.

24. The method of claim 1, wherein the mapping is based on a mapping rule signaled by a second node.

25. The method of claim 24, wherein the second node comprises a base station.

26. The method of claim 24 wherein the mapping rule is signaled in remaining minimum system information.

27. The method of claim 24 wherein the mapping rule is signaled in one of: remaining minimum system information, a master information block received via a physical broadcast channel, other system information, a handover message, radio resource control signaling, downlink control information, or a combination of a primary synchronization signal, a secondary synchronization signal, and a demodulation reference signal received via a physical broadcast channel.

28. The method of claim 1, wherein the number of actually transmitted reference signals is less than a maximum number of reference signals.

29. An apparatus for wireless communications at a first node, comprising:
a transceiver;
a memory; and
a processor communicatively coupled with the transceiver and the memory, the processor and the memory configured to:
identify information comprising a number of actually transmitted reference signals, a number of available physical random access channel (PRACH) time-frequency resources in a time period, and a number of configured PRACH time-frequency resources per reference signal;
determine that the available number of PRACH time-frequency resources within the time period is not an integer multiple of the product of the number of actually transmitted reference signals and the number of configured PRACH time-frequency resources per reference signal; and
map the actually transmitted reference signals to the available PRACH time-frequency resources based on the identified information and in response to the determination.

30. The apparatus of claim 29, wherein the time period is defined as $2^x$ multiplied by a pre-specified time period, wherein x is a non-negative integer.

31. The apparatus of claim 30, wherein the pre-specified time period is one of 10 ms, 20 ms, 40 ms, 80 ms or 160 ms.

32. The apparatus of claim 30, wherein x is a minimum, non-negative integer that allows mapping from all actually transmitted synchronization signal blocks to PRACH time-frequency resources and/or preamble indices in one time period.

33. The apparatus of claim 29, wherein the time period is defined as $2^x$ multiplied by a network configured time period, wherein x is a minimum, non-negative integer that allows mapping from all actually transmitted synchronization signal blocks to PRACH time-frequency resources and/or preamble indices in one time period.

34. The apparatus of claim 33, wherein the network configured time period is a RACH configuration period.

35. The apparatus of claim 33, wherein the network configured time period is configured using one or more of a master information block (MIB), a remaining minimum system information (RMSI), a broadcast other system information (OSI), a handover message, an RRC message, a MAC-CE, or a downlink control information (DCI).

36. The apparatus of claim 29, wherein the reference signal is a synchronization signal.

37. The apparatus of claim 29, wherein the first node comprises a UE.

38. The apparatus of claim 29, wherein the time period is equal to a RACH configuration period.

39. The apparatus of claim 29, wherein the PRACH time-frequency resource denotes a RACH transmission occasion.

40. The apparatus of claim 29, wherein the time period is equal to a duration of one RACH transmission occasion.

41. The apparatus of claim 29, wherein the time period is a minimum amount of time duration that contains sufficient preamble indices corresponding to all actually transmitted reference signals.

42. The apparatus of claim 29, wherein the processor and the memory are configured to repeat the mapping from the number of actually transmitted reference signals to PRACH time-frequency resources for a maximum possible integer number of times.

43. The apparatus of claim 42, wherein a remaining number of PRACH resources within the time period are not used for PRACH transmission.

44. The apparatus of claim 42, the processor and the memory are configured to allocate a remaining number of PRACH resources to a transmission other than PRACH.

45. The apparatus of claim 42, wherein the transmission other than the PRACH is one of a physical uplink shared channel, physical downlink shared channel, antenna calibration, or MPE detection.

46. The apparatus of claim 42, wherein the processor and the memory are configured to map a remaining number of PRACH resources to a subset of the actually transmitted reference signals.

47. The apparatus of claim 46, wherein the processor and the memory are configured to map the remaining number of PRACH resources in an order indicated by the PRACH configuration index.

48. The apparatus of claim 42, wherein the actually transmitted reference signals are allocated an unequal number of PRACH resources.

49. The apparatus of claim 42, wherein the number of PRACH resources or PRACH preamble indices mapped to each reference signal in a remaining number of PRACH resources or PRACH preamble indices is less than a number of PRACH resources or PRACH preamble indices that is mapped to reference signals through repeating the mapping.

50. The apparatus of claim 29, wherein the processor and the memory are configured to:
receive at least one reference signal transmitted by a base station;
select a PRACH resource corresponding to the at least one reference signal; and
transmit a random access preamble on the selected PRACH resource.

51. The apparatus of claim 29, wherein the processor and the memory are configured to map based on a pre-defined mapping rule.

52. The apparatus of claim 29, wherein the processor and the memory are configured to map based on a mapping rule signaled by a second node.

53. The apparatus of claim 52, wherein the second node comprises a base station.

54. The apparatus of claim 52 wherein the mapping rule is signaled in remaining minimum system information.

55. The apparatus of claim 52 wherein the mapping rule is signaled in one of: remaining minimum system information, a master information block received via a physical broadcast channel, other system information, a handover message, radio resource control signaling, downlink control information, or a combination of a primary synchronization signal, a secondary synchronization signal, and a demodulation reference signal received via a physical broadcast channel.

56. The apparatus of claim 29, wherein the number of actually transmitted reference signals is less than a maximum number of reference signals.

57. An apparatus for wireless communications at a first node, comprising:
means for identifying information comprising a number of actually transmitted reference signals, a number of available physical random access channel (PRACH) time-frequency resources in a time period, and a number of configured PRACH time-frequency resources per reference signal;
means for determining that the available number of PRACH time-frequency resources within the time period is not an integer multiple of the product of the number of actually transmitted reference signals and the number of configured PRACH time-frequency resources or PRACH preamble indices per reference signal; and
means for mapping the actually transmitted reference signals to the available PRACH time-frequency resources and preamble indices based on the identified information and in response to the determination.

58. A non-transitory computer-readable medium storing computer code executable by a processor of a first node for wireless communications, comprising computer executable code to:
identify information comprising a number of actually transmitted reference signals, a number of available physical random access channel (PRACH) time-frequency resources in a time period, and a number of configured PRACH time-frequency resources per reference signal;
determine that the number of available PRACH time-frequency resources within the time period is not an integer multiple of the product of the number of actually transmitted reference signals per reference signal; and map the actually transmitted reference signals to the available PRACH time-frequency resources based on the identified information and in response to the determination.

59. A method of wireless communications, comprising:
receiving, at a user equipment (UE), an indication of a number of actually transmitted synchronization signal (SS) blocks transmitted by a base station;
receiving, at the UE, a physical random access channel (PRACH) configuration index identifying a RACH configuration period and a number of configured PRACH resources per SS-block;
determining a time period that contains a number of PRACH resources greater than the product of the number of actually transmitted SS-blocks and the number of PRACH resources per SS-block;
determining that a supported number of PRACH resources within the RACH time period is not an integer multiple of the product of the number of actually transmitted SS-blocks and the number of configured PRACH resources per SS-block; and
mapping the number of actually transmitted SS-blocks an integer number of times within the PRACH resources of the time period, wherein a remaining number of PRACH resources are not assigned to an SS-block.

60. The method of claim 59, wherein the mapping comprises allocating the remaining number of PRACH resources to a transmission other than the PRACH.

61. The method of claim 60, wherein the transmission other than the PRACH is one of a physical uplink shared channel, physical downlink shared channel, antenna calibration, or MPE detection.

62. The method of claim 59, further comprising:
receiving at least one SS-block transmitted by the base station;
selecting a PRACH resource corresponding to the at least one SS-block; and
transmitting a random access preamble on the selected PRACH resource.

63. The method of claim 59, wherein the mapping is based on a pre-defined mapping rule.

64. The method of claim 59, wherein the mapping is based on a mapping rule signaled by the base station.

65. The method of claim 64 wherein the mapping rule is signaled in remaining minimum system information.

66. The method of claim 64 wherein the mapping rule is signaled in one of: system information, a management information block received via a physical broadcast channel, a handover message, radio resource control signaling, downlink control information, or a combination of primary synchronization signal, secondary synchronization signal, and a demodulation reference signal received via the physical broadcast channel.

67. The method of claim 59, wherein the number of actually transmitted SS-blocks is less than a maximum number of SS-blocks.

68. A user equipment (UE), comprising:
a transceiver;
a memory; and
a processor communicatively coupled with the transceiver and the memory, the processor and the memory configured to:
receive, at the UE, an indication of a number of actually transmitted synchronization signal (SS) blocks transmitted by a base station;
receive, at the UE, a physical random access channel (PRACH) configuration index identifying a RACH configuration period and a number of configured PRACH resources per SS-block;

determine a time period that contains a number of PRACH resources greater than the product of the number of actually transmitted SS-blocks and the number of PRACH resources per SS-block;

determine that a supported number of PRACH resources within the time period is not an integer multiple of the product of the number of actually transmitted SS-blocks and the number of configured PRACH resources per SS-block; and map the number of actually transmitted SS-blocks an integer number of times within the PRACH resources of the time period, wherein a remaining number of PRACH resources are not assigned to an SS-block.

69. The UE of claim 68, wherein the processor and memory are configured to allocate the remaining number of PRACH resources to a transmission other than the PRACH.

70. The UE of claim 69, wherein the transmission other than the PRACH is one of a physical uplink shared channel, physical downlink shared channel, antenna calibration, or MPE detection.

71. The UE of claim 68, wherein the processor and memory are configured to receive at least one SS-block transmitted by the base station;
select a PRACH resource corresponding to the at least one SS-block; and
transmit a random access preamble on the selected PRACH resource.

72. The UE of claim 68, wherein the mapping is based on a pre-defined mapping rule.

73. The UE of claim 68, wherein the mapping is based on a mapping rule signaled by the base station.

74. The UE of claim 73, wherein the mapping rule is signaled in remaining minimum system information.

75. The UE of claim 74 wherein the mapping rule is signaled in one of:
system information, a management information block received via a physical broadcast channel, a handover message, radio resource control signaling, downlink control information, or a combination of primary synchronization signal, secondary synchronization signal, and a demodulation reference signal received via the physical broadcast channel.

76. The UE of claim 74, wherein the number of actually transmitted SS-blocks is less than a maximum number of SS-blocks.

77. A user equipment (UE), comprising:
means for receiving, at the UE, an indication of a number of actually transmitted synchronization signal (SS) blocks transmitted by a base station;

means for receiving, at the UE, a physical random access channel (PRACH) configuration index identifying a RACH configuration period and a number of configured PRACH resources per SS-block;

means for determining a time period that contains a number of PRACH resources greater than the product of the number of actually transmitted SS-blocks and the number of PRACH resources per SS-block means for determining that a supported number of PRACH resources within the time period is not an integer multiple of the product of the number of actually transmitted SS-blocks and the number of configured PRACH resources per SS-block; and means for mapping the number of actually transmitted SS-blocks an integer number of times within the PRACH resources of the time period, wherein a remaining number of PRACH resources are not assigned to an SS-block.

78. A non-transitory computer-readable medium storing computer code executable by a processor for wireless communications, comprising computer executable code to:
receive, at a user equipment (UE), an indication of a number of actually transmitted synchronization signal (SS) blocks transmitted by a base station;

receive, at the UE, a physical random access channel (PRACH) configuration index identifying a RACH configuration period and a number of configured PRACH resources per SS-block;

determine a time period that contains a number of PRACH resources greater than the product of the number of actually transmitted SS-blocks and the number of PRACH resources per SS-block;

determine that a supported number of PRACH resources within the time period is not an integer multiple of the product of the number of actually transmitted SS-blocks and the number of configured PRACH resources per SS-block; and map the number of actually transmitted SS-blocks an integer number of times within the PRACH resources of the time period, wherein a remaining number of PRACH resources are not assigned to an SS-block.

* * * * *